(12) United States Patent
Tsuji et al.

(10) Patent No.: US 10,000,585 B2
(45) Date of Patent: Jun. 19, 2018

(54) PROCESS FOR PRODUCING AROMATIC VINYL/CONJUGATED DIENE COPOLYMER AND PRODUCT OF HYDROGENATION THEREOF

(71) Applicant: KURARAY CO., LTD., Kurashiki-shi (JP)

(72) Inventors: Tomoaki Tsuji, Kamisu (JP); Masataka Shintani, Kurashiki (JP); Yasuhiro Hatanaka, Kamisu (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days. days.

(21) Appl. No.: 15/538,368

(22) PCT Filed: Dec. 25, 2015

(86) PCT No.: PCT/JP2015/086336
§ 371 (c)(1),
(2) Date: Jun. 21, 2017

(87) PCT Pub. No.: WO2016/104745
PCT Pub. Date: Jun. 30, 2016

(65) Prior Publication Data
US 2018/0002457 A1 Jan. 4, 2018

(30) Foreign Application Priority Data

Dec. 25, 2014 (JP) .................................. 2014-262847

(51) Int. Cl.
*C08F 6/12* (2006.01)
*C08F 236/10* (2006.01)
(Continued)

(52) U.S. Cl.
CPC .................. *C08F 2/06* (2013.01); *C08F 4/46* (2013.01); *C08F 6/12* (2013.01); *C08F 8/04* (2013.01);
(Continued)

(58) Field of Classification Search
CPC ........................................................ C08F 6/12
See application file for complete search history.

(56) References Cited

U.S. PATENT DOCUMENTS 5,283,021 A 2/1994 Shih
2001/0056176 A1* 12/2001 Takami ..................... C08C 2/06
528/503

FOREIGN PATENT DOCUMENTS

JP 2-189304 A 7/1990
JP 4-175304 A 6/1992
(Continued)

OTHER PUBLICATIONS

International Search Report dated Feb. 16, 2016 in PCT/JP2015/086336 filed Dec. 25, 2015.

*Primary Examiner* — Vu A Nguyen
(74) *Attorney, Agent, or Firm* — Oblon, McClelland, Maier & Neustadt, L.L.P.

(57) ABSTRACT

As a method for producing a copolymer with a high oil absorption rate by separating a solvent from a copolymer solution containing a copolymer in a simple manner with a less energy consumption, the present invention relates to a production method for obtaining a copolymer by separating a solvent from a copolymer solution, the method including the following Steps A to C.

Step A: a step of regulating a solid component concentration (Ts) of the copolymer solution to a range of (5≤Ts≤60) in terms of a mass %, Step B: a step of heating the copolymer (P) solution obtained in the Step A such that a temperature T (° C.) is in a specified range, and (Continued)

Step C: a step of discharging the copolymer solution heated in the Step B from a specified nozzle at a linear velocity of 1 to 100 m/sec to separate the solvent in an inert gas stream at 0 to 200° C.

13 Claims, 3 Drawing Sheets

(51) Int. Cl.
    *C08F 297/04*     (2006.01)
    *C08F 2/06*     (2006.01)
    *C08F 212/08*     (2006.01)
    *C08F 4/46*     (2006.01)
    *C08F 8/04*     (2006.01)
    *D01F 6/78*     (2006.01)

(52) U.S. Cl.
    CPC .......... *C08F 212/08* (2013.01); *C08F 236/10* (2013.01); *C08F 297/04* (2013.01); *D01F 6/78* (2013.01)

(56) References Cited

FOREIGN PATENT DOCUMENTS

| | | |
|---|---|---|
| JP | 7-13091 B2 | 2/1995 |
| JP | 2000-351808 A | 12/2000 |
| JP | 2004-91752 A | 3/2004 |
| JP | 2004-155851 A | 6/2004 |
| JP | 2006-241176 A | 9/2006 |
| JP | 2008-231371 A | 10/2008 |
| JP | 2009-91574 A | 4/2009 |
| JP | 2009-126947 A | 6/2009 |
| JP | 2010-155966 A | 7/2010 |
| JP | 4625148 B2 | 2/2011 |
| JP | 2012-508800 A | 4/2012 |
| JP | 2013-522435 A | 6/2013 |
| WO | WO 2006/088160 A1 | 8/2006 |

* cited by examiner

[Fig. 1]
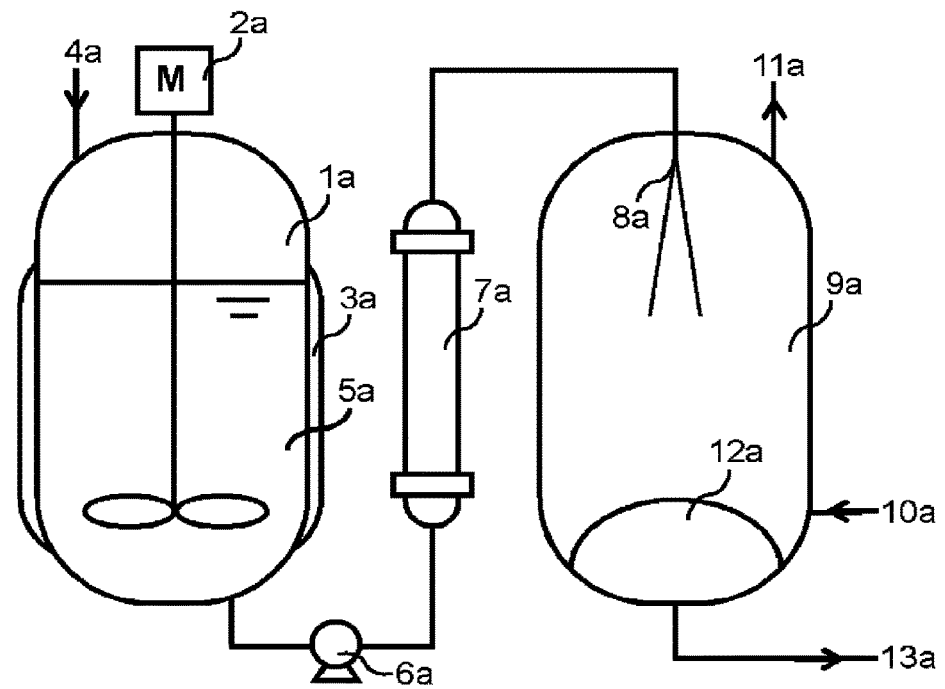
[Fig. 2]
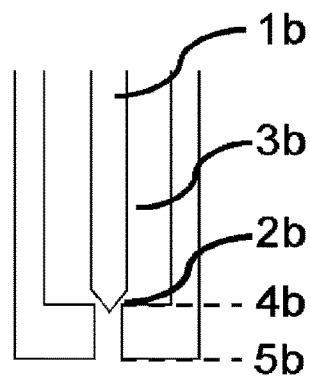

[Fig. 3]
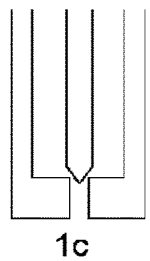 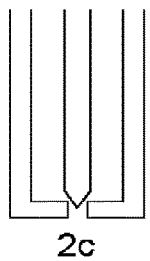 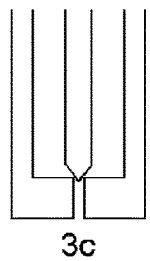 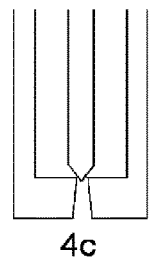 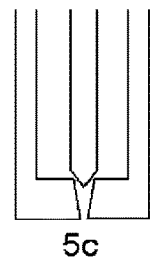
1c 2c 3c 4c 5c
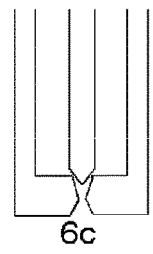 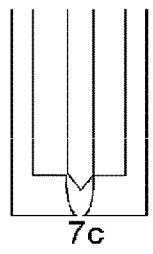 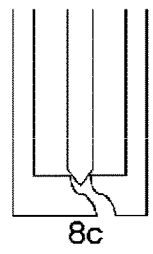 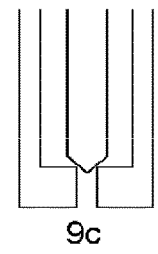 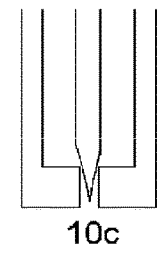
6c 7c 8c 9c 10c
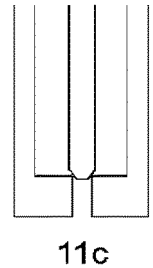 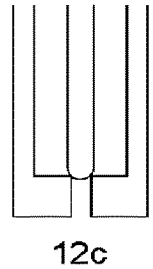 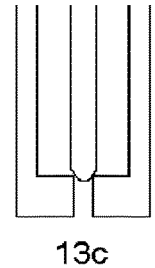 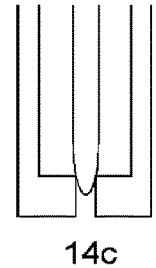 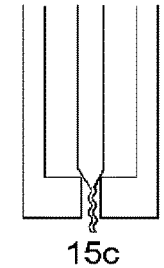
11c 12c 13c 14c 15c
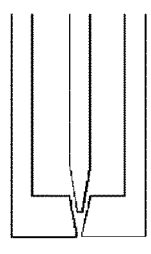 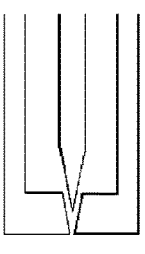 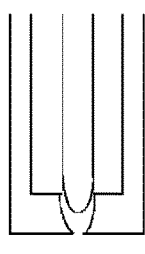 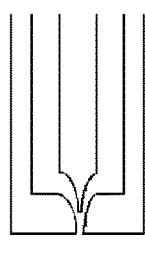 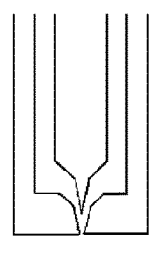
16c 17c 18c 19c 20c

[Fig. 4]
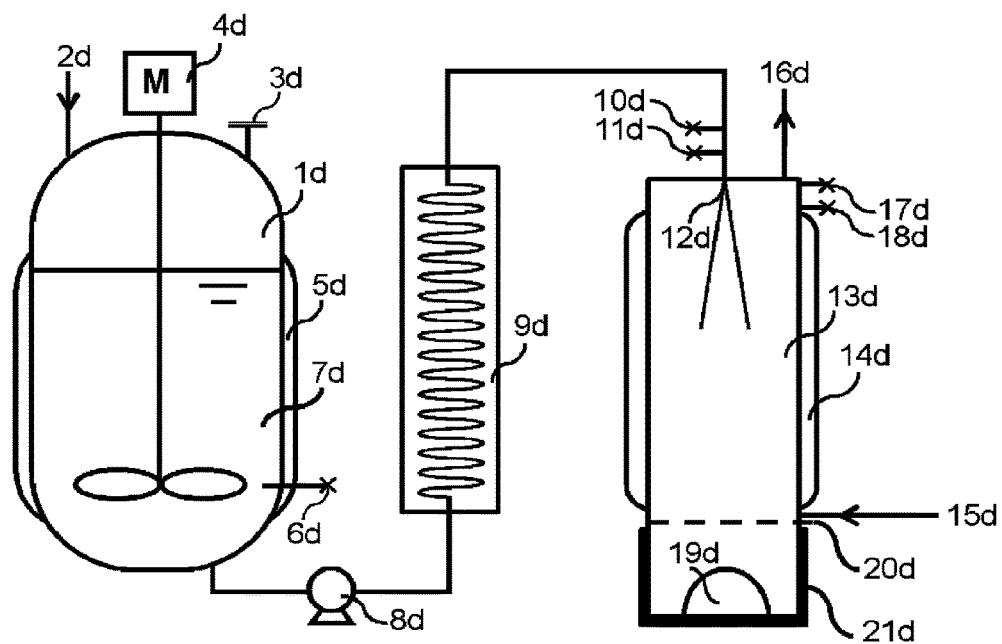
[Fig. 5]
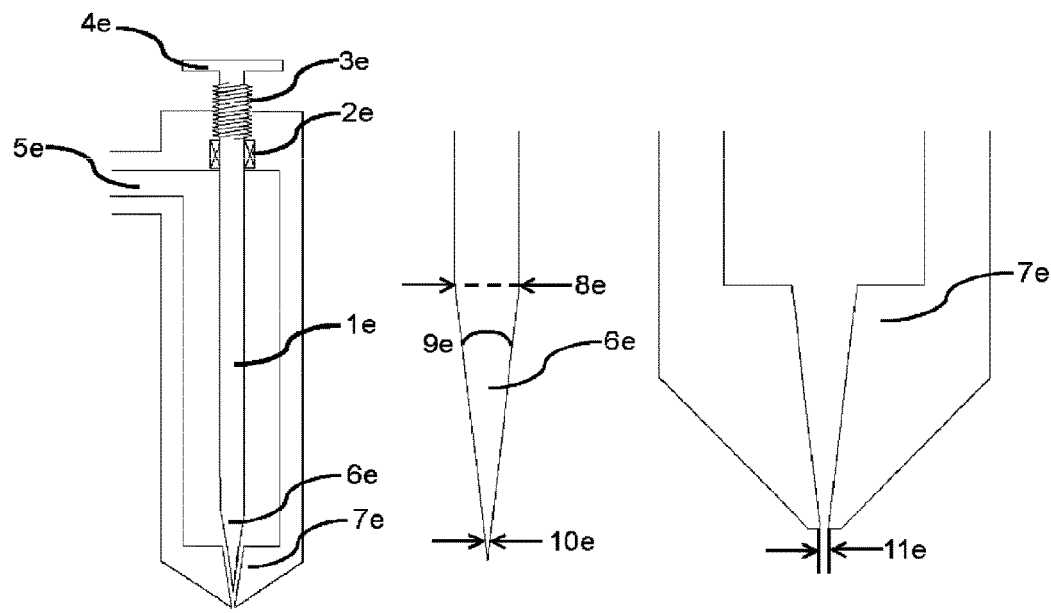

ered shape by removing the solvent from the copolymer solution, there is exemplified a direct devolatilization method for powder production, as disclosed in PTL 11 and so on. PTL 11 discloses a method in which a mixture prepared by mixing the copolymer solution with a heating fluid, such as water, etc., by a static mixer is heated at 60 to 250° C. and then sprayed from a nozzle to obtain a powdered copolymer, and subsequently, the heating fluid component is removed by using an extruder.

PROCESS FOR PRODUCING AROMATIC VINYL/CONJUGATED DIENE COPOLYMER AND PRODUCT OF HYDROGENATION THEREOF

TECHNICAL FIELD

The present invention relates to a method for producing a copolymer by separating a solvent from a copolymer solution containing at least one copolymer selected from an aromatic vinyl compound-conjugated diene copolymer, a hydride of the copolymer, and a mixture thereof.

BACKGROUND ART

Among copolymers of a conjugated diene and an aromatic vinyl compound, block copolymers which are composed of a conjugated diene block mainly composed of a conjugated diene unit and an aromatic vinyl compound block mainly composed of an aromatic vinyl compound unit exhibit strength and elastic properties equal to those in conventional vulcanized rubbers, without being vulcanized, and therefore, they are widely used alone or as a composition with other thermoplastic resin or a softening agent in fields of automotive components, household electrical components, electrical wire coatings, medical components, footwear, miscellaneous goods, and so on. In addition, it is also known that by hydrogenating an unsaturated double bond derived from a conjugated diene, heat resistance, oxidation resistance, weather resistance, ozone resistance, and so on of copolymers can be improved.

These copolymers are commercially available in various shapes, such as a crumb shape (agglomerate of porous fine particles), a pellet shape, a powdered shape, etc. Especially, those in a crumb shape have such a characteristic feature that due to a high specific surface area, absorption of a softening agent, such as an oil, etc., is good, so that on producing a composition, kneading is readily achieved.

Now, a copolymer composed of a conjugated diene and an aromatic vinyl compound can be, for example, produced by a liquid phase anionic polymerization method of using an organic alkali metal compound as a polymerization initiator in the presence of an inert gas and a hydrocarbon solvent that is inert to the polymerization initiator. In addition, hydrogenation of the copolymer can be carried out in the presence of a hydrogen gas, a hydrogenation catalyst, and a solvent that is inert to the hydrogenation reaction.

Since the thus produced copolymer, hydrogenated copolymer, or mixture thereof is obtained in a state where it is uniformly dissolved or suspended in the solvent used for the reaction, it is necessary to obtain the copolymer by removing the solvent from such a copolymer solution. For the purposes of removing the solvent from the copolymer solution with a less energy, increasing an oil absorption rate of the resulting copolymer, and so on, a variety of solvent separation methods have been investigated so far.

As a representative method for obtaining a copolymer in a crumb shape by removing the solvent from the copolymer solution, there is exemplified a steam stripping method disclosed in PTLs 1 to 3 and so on. Specifically, the steam stripping method is a method in which a mixed liquid obtained by bringing the copolymer solution into contact with steam in the inside of a nozzle, or a suspension liquid obtained by mixing the copolymer solution with an aqueous solvent in the inside of a nozzle, is fed into a desolvation tank where hot water resides; the solvent is distilled off together with a water vapor to obtain an aqueous slurry of a crumb; subsequently, the aqueous slurry is passed through a screen to obtain a hydrated crumb; the hydrated crumb is subjected to dehydration in a mechanical compression mode using rolls, a Banbury type dehydrator, a screw extrusion type press dehydrator, or the like; and the resultant is then dried in a mechanical compression mode using a screw extrusion type dryer, a kneader type dryer, an expander type dryer, or the like, or in a non-compression mode using a hot air dryer or the like. If desired, such a crumb can also be pelletized by mixing with other organic compound or inorganic compound, followed by treatment by using an extruder.

As a representative method for obtaining a copolymer in a pellet shape by removing the solvent from the copolymer solution, there is exemplified a direct devolatilization method for pellet production in which a highly concentrated liquid is charged in a multi-vent extruder, as disclosed in PTLs 4 to 10 and so on. Specifically, the direct devolatilization method for pellet production is a method in which a highly concentrated liquid obtained by subjecting a non-copolymer solution heated to 200 to 300° C. under pressure to flash concentration is mixed with water, if desired and charged in a mixing apparatus having an internal movable mixing section, such as a multi-vent extruder, etc., and a pellet is obtained while allowing the removal of the solvent to proceed.

As a representative method for obtaining a copolymer in a powdered shape by removing the solvent from the copolymer solution, there is exemplified a direct devolatilization method for powder production, as disclosed in PTL 11 and so on. PTL 11 discloses a method in which a mixture prepared by mixing the copolymer solution with a heating fluid, such as water, etc., by a static mixer is heated at 60 to 250° C. and then sprayed from a nozzle to obtain a powdered copolymer, and subsequently, the heating fluid component is removed by using an extruder.

CITATION LIST

Patent Literature

PTL 1: JP 2-189304 A
PTL 2: JP 7-13091 B
PTL 3: JP 4625148 B
PTL 4: JP 2010-155966 A
PTL 5: JP 2012-508800 A
PTL 6: JP 2013-522435 A
PTL 7: JP 4-175304 A
PTL 8: JP 2000-351808 A
PTL 9: JP 2008-231371 A
PTL 10: JP 2009-126947 A
PTL 11: U.S. Pat. No. 5,283,021 A

SUMMARY OF INVENTION

Technical Problem

In the aforementioned steam stripping method, it is attempted to produce a crumb with a high oil absorption rate in a less energy consumption by a method of improving the nozzle for bringing the copolymer solution into contact with steam, improving a stirring blade of the desolvation tank and the steam feed, crushing the crumb in the slurry by a crushing pump, or the like. However, in view of the matter that an instrument, such as a compression dehydrator, etc., and the energy for removing water are necessary, there was involved such a problem that the economic efficiency is low.

In the aforementioned direct volatilization method for pellet production, in order to avoid a problem, such as vent-up, etc., it is necessary to increase a solid component concentration in the highly concentrated liquid to 50 mass % or more. In general, flash concentration or the like is adopted for production of the highly concentrated liquid. However, there were involved such problems that a flash concentration tank is difficult for cleaning due to a high viscosity of the highly concentrated liquid, and the process passing properties are low; that in order to achieve sufficient cleaning, it is necessary to provide a stirring blade or the like in the flask concentration tank, so that the economic efficiency is low; that in order to volatilize the solvent by using the extruder, thorough shearing and long residence time are required, so that heat deterioration of the copolymer or gelation by three-dimensional crosslinking is liable to occur, resulting in worsening of a product's value; and so on.

In the aforementioned direct volatilization method for powder production, there were involved such problems that in the case of using the heating fluid, such as water, etc., a drying step for removing the heating fluid is needed, so that the economic efficiency is low; that heat deterioration of the copolymer or gelation by three-dimensional crosslinking by the drying steps is liable to occur, resulting in worsening of a product's value; and so on.

Furthermore, as a result of investigations made by the present inventors, commercially available copolymers in a crumb shape were not satisfactory because the oil absorption rate thereof is less than 10.

Thus, a problem of the present invention is to produce a copolymer with a high oil absorption rate by separating a solvent from a copolymer solution containing the copolymer in a simple manner with a less energy consumption without requiring a dehydration·drying step.

Solution to Problem

The present inventors made extensive and intensive investigations. As a result, it has been found that the aforementioned problem can be solved by using a specified solvent having a boiling point at atmospheric pressure (1 atm) of 30 to 100° C. and discharging a heated copolymer solution at a specified linear velocity, leading to accomplishment of the present invention.

Specifically, the present invention is concerned with the following.

[1] A method for producing a copolymer (P), including
separating a solvent contained in a copolymer (P) solution to obtain the copolymer (P),
the copolymer (P) being at least one copolymer selected from an aromatic vinyl compound-conjugated diene copolymer composed of at least one conjugated diene and at least one aromatic vinyl compound and having a weight average molecular weight of 10,000 to 1,000,000, a hydride of the copolymer, and a mixture thereof;
the solvent being a saturated aliphatic hydrocarbon solvent or a saturated alicyclic hydrocarbon solvent each having a boiling point of 30 to 100° C.; and
the method including the following Steps A to C:
Step A: a step of regulating a solid component concentration (Ts) of the copolymer (P) solution to a range of (5≤Ts≤60) in terms of a mass %,
Step B: a step of heating the copolymer (P) solution obtained in the Step A such that a temperature T (° C.) is in a range of {(225−1.9×Ts)≤T≤(310−1.9×Ts)}, and
Step C: a step of discharging the copolymer (P) solution heated in the Step B from any one nozzle selected from a rotary wheel atomizer, a two-fluid nozzle atomizer, and a pressure nozzle atomizer at a linear velocity of 1 to 100 m/sec to separate the solvent in an inert gas stream at 0 to 200° C.

[2] The method for producing a copolymer (P) as set forth in the item [1], wherein the copolymer (P) is at least one copolymer selected from a block copolymer composed of a polymer block (b) containing at least one conjugated diene unit and a polymer block (a) containing at least one aromatic vinyl compound unit, a hydride of the block copolymer, and a mixture thereof.

[3] The method for producing a copolymer (P) as set forth in the item [1] or [2], wherein the copolymer (P) is one produced by liquid phase anionic polymerization using an organic alkali metal compound.

[4] The method for producing a copolymer (P) as set forth in any of the items [1] to [3], wherein a molar weight distribution of the block copolymer constituting the copolymer (P) is in a range of 1.0 to 2.5.

[5] The method for producing a copolymer (P) as set forth in any of the items [1] to [4], wherein the solvent is at least one selected from isopentane, pentane, cyclopentane, hexane, cyclohexane, isoheptane, and heptane.

[6] The method for producing a copolymer (P) as set forth in any of the items [1] to [5], wherein the temperature T (° C.) in the Step B is in a range of 200 to 275° C.

[7] The method for producing a copolymer (P) as set forth in any of the items [1] to [6], wherein the solid component concentration (Ts) of the copolymer (P) solution in the Step A is (10≤Ts≤35) in terms of a mass %.

[8] The method for producing a copolymer (P) as set forth in any of the items [1] to [7], wherein the linear velocity in the Step C is from 5 to 50 m/sec.

[9] The method for producing a copolymer (P) as set forth in any of the items [1] to [8], wherein the temperature of the inert gas in the Step C is from 10 to 120° C.

[10] The method for producing a copolymer (P) as set forth in any of the items [1] to [9], wherein an amount of the inert gas used in the Step C is from 0.01 to 5.0 NL relative to 1 kg of the copolymer (P) solution.

[11] The method for producing a copolymer (P) as set forth in any of the items [1] to [10], wherein the copolymer (P) obtained through the Step C is a fibrous copolymer.

[12] The method for producing a copolymer (P) as set forth in any of the items [1] to [11], wherein an amount of the residual solvent in the copolymer (P) obtained through the Step C is 2 mass % or less.

[13] The method for producing a copolymer (P) as set forth in any of the items [1] to [12], wherein a bulk density of the copolymer (P) obtained through the Step C is from 0.02 to 0.20 g/mL, and an oil absorption rate thereof is from 10 to 50.

Advantageous Effects of Invention

In accordance with the production method of the present invention, a solvent can be removed from a copolymer solution in a simple manner with a less energy consumption without requiring a dehydration·drying step, and a copolymer with a high oil absorption rate can be industrially advantageously produced.

BRIEF DESCRIPTION OF DRAWINGS

FIG. 1 is a diagrammatic view illustrating an apparatus for separating a solvent from a copolymer solution, which is used in the present invention.

FIG. 2 is a diagrammatic view illustrating a structure of a pressure nozzle atomizer which is used in the present invention.

FIG. 3 is a diagrammatic view illustrating a disk and a body of a pressure nozzle atomizer which is used in the present invention.

FIG. 4 is a diagrammatic view of a copolymer production apparatus used in Example 1 of the present invention.

FIG. 5 is a diagrammatic view of a pressure nozzle atomizer used in Example 1 of the present invention.

DESCRIPTION OF EMBODIMENTS

The copolymer (P) which is obtained by the production method of the present invention is at least one selected from an aromatic vinyl compound-conjugated diene copolymer composed of at least one conjugated diene and at least one aromatic vinyl compound and having a weight average molecular weight of 10,000 to 1,000,000, a hydride of the copolymer, and a mixture thereof.

(Aromatic Vinyl Compound-Conjugated Diene Copolymer)

Though a structure of the conjugated diene that is a constituent unit of the aromatic vinyl compound-conjugated diene copolymer is not particularly limited, it is preferred to use a conjugated diene capable of being polymerized through anionic polymerization. For example, examples of a conjugated diene having 4 to 15 carbon atoms include butadiene, isoprene, 2,3-dimethyl -1,3-butadiene, 1,3-pentadiene, 2-methyl-1,3-pentadiene, 3-methyl-1,3-pentadiene, 1,3-hexadiene, 4,5-diethyl-1,3-butadiene, phenyl-1,3-butadiene, 4,5-diethyl-1,3-octadiene, 3-butyl -1,3-octadiene, 1,3-cyclohexadiene, 1,3,7-octatriene, myrcene (7-methyl-3-methyleneocta-1,6-diene), farnesene (3,7,11-trimethyl-1,3,6,10-dodecatetraene), and the like. These conjugated dienes may be used either alone or in combination of two or more thereof.

Among them, examples of a conjugated diene having 4 to 8 carbon atoms, which is readily industrially available, include butadiene, isoprene, 2,3-dimethyl-1,3-butadiene, 1,3-pentadi ene, 2-methyl-1,3-pentadiene, 3-methyl-1,3-pentadiene, 1,3-hexadiene, 4,5-diethyl-1,3-butadiene, 4,5-diethyl-1,3-octadiene, 1,3-cyclohexadiene, 1,3,7-octatriene, and the like. These conjugated dienes may be used either alone or in combination of two or more thereof.

Especially, in the case of using butadiene, isoprene, or a mixture of butadiene and isoprene, in view of the fact that dynamic physical properties of the polymer can be simply altered by a change of binding mode or the like, it is more preferred to use such.

Though a structure of the aromatic vinyl compound that is a constituent unit of the aromatic vinyl compound-conjugated diene copolymer is not particularly limited, it is preferred to use an aromatic vinyl compound capable of being polymerized through anionic polymerization. For example, examples of an aromatic vinyl compound having 8 to 15 carbon atoms include styrene, α-methylstyrene, α-methyl-4-methylstyrene, 2-methyl styrene, 3-methyl styrene, 4-methyl styrene, 2,4-dimethyl styrene, 2,5-dimethylstyrene, 3,4-dimethyl styrene, 3,5-dimethyl styrene, 2-ethyl styrene, 3-ethylstyrene, 4-ethylstyrene, 4-n-propyl styrene, 4-i sopropyl styrene, 4-tert-butyl styrene, 4-cyclohexyl styrene, 4-dodecyl styrene, 2-ethyl-4-benzylstyrene, 4-(4-phenyl-n-butyl)styrene, 1-vinylnaphthalene, 2-vinylnaphthalene, 1,1-diphenylethylene, N,N-dimethyl -p-aminoethyl styrene, N,N-diethyl-p-aminoethylstyrene, 1,2-divinylbenzene, 1,3-divinylbenzene, 1,4-divinylbenzene, 1,2-divinyl-3,4-dimethylbenzene, 2,4-divinylbiphenyl, 1,3-divinylnaphthalene, 1,2,4-trivinylbenzene, 3,5,4'-trivinylbiphenyl, 1,3,5-trivinylnaphthalene, 1,5,6-trivinyl-3,7-diethylnaphthalene, and the like. These aromatic vinyl compounds may be used either alone or in combination of two or more thereof.

Among them, examples of an aromatic vinyl compound having 8 to 9 carbon atoms, which is readily industrially available, include styrene, α-methylstyrene, 2-methylstyrene, 3-methylstyrene, 4-methylstyrene, and the like. These aromatic vinyl compounds may be used either alone or in combination of two or more thereof.

Especially, in the case of using styrene, in view of the fact that dynamic physical properties of the polymer can be simply altered by a binding repeating sequence with the conjugated diene, styrene is more preferred.

In a binding mode between the at least one conjugated diene and the at least one aromatic vinyl compound constituting the aromatic vinyl compound-conjugated diene copolymer, the binding mode is not particularly limited, and any of a random copolymer, a block copolymer, a block copolymer having a tapered structure, a star copolymer, and so on may be adopted. Furthermore, the binding mode of the conjugated diene (in the case of butadiene, a 1,2-binding unit and a 1,4-binding unit; and in the case of isoprene, a 1,2-binding unit, a 3,4-binding unit, and a 1,4-binding unit) is not particularly limited, too.

Among them, from the viewpoint of revealing strength and elastic properties equal to those in conventional vulcanized rubbers at ordinary temperature without being vulcanized, a block copolymer is preferred, and a block copolymer composed of a polymer block (b) containing at least one conjugated diene unit and a polymer block (a) containing at least one aromatic vinyl compound unit is more preferred. As a binding mode of the block copolymer, a diblock copolymer represented by (a)-(b), a triblock copolymer represented by (a)-(b)-(a), a tetrablock copolymer represented by (a)-(b)-(a)-(b), and so on are preferred (in the formulae, (a) represents the aforementioned polymer block (a), and (b) represents the aforementioned polymer block (b)).

The polymer block (b) containing at least one conjugated diene unit is one containing preferably 50 mass % or more, more preferably 70 mass % or more, and still more preferably of 90 mass % or more of a constituent unit based on the conjugated diene. The polymer block (a) containing at least one aromatic vinyl compound unit is one containing preferably 50 mass % or more, more preferably 70 mass % or more, and still more preferably 90 mass % or more of a constituent unit based on the aromatic vinyl compound. That is, in the polymer block (b), a constituent unit based on a monomer other than the conjugated diene may be contained; in the polymer block (a), a constituent unit based on a monomer other than the aromatic vinyl compound may be contained; and a binding mode of the constituent units in each of the polymer blocks is not particularly limited.

In the aromatic vinyl compound-conjugated diene copolymer, the content of the constituent unit derived from at least one aromatic vinyl compound is preferably 5 to 90 mass %, more preferably 5 to 60 mass %, and still more preferably 10 to 45 mass %. In addition, in the aforementioned copolymer, the content of the constituent unit derived from at least one conjugated diene is preferably 10 to 95 mass %, more preferably 40 to 95 mass %, and still more preferably 55 to 90 mass %. When the content of the constituent unit derived from an aromatic vinyl compound or the constituent unit derived from a conjugated diene falls within the aforementioned range, a copolymer with a less amount of the residual solvent can be produced in high volumetric efficiency by the production method of the present invention.

In the case where the aforementioned copolymer is a block copolymer of the aforementioned polymer block (a) and the aforementioned polymer block (b), the content of the polymer block (a) in the block copolymer is preferably 5 to 90 mass %, more preferably 5 to 60 mass %, and still more preferably 10 to 45 mass %. The content of the polymer block (b) in the block copolymer is preferably 10 to 95 mass %, more preferably 40 to 95 mass %, and still more preferably 55 to 90 mass %.

A weight average molecular weight (Mw) of the aforementioned copolymer is 10,000 to 1,000,000, more preferably 25,000 to 750,000, still more preferably 30,000 to 500,000, and especially preferably 40,000 to 350,000. When the Mw falls within the aforementioned range, a copolymer with a less amount of the residual solvent can be produced in high volumetric efficiency by the production method of the present invention. In addition, in the case where the aforementioned copolymer is a block copolymer having the polymer block (a) and the polymer block (b), the Mw of the polymer block (a) is preferably 2,500 to 400,000, more preferably 2,500 to 200,000, and still more preferably 3,000 to 100,000. The Mw of the polymer block (b) is preferably 10,000 to 600,000, more preferably 20,000 to 450,000, and still more preferably 30,000 to 250,000.

A molecular weight distribution (Mw/Mn) of the aforementioned copolymer is typically in a range of 1.0 to 5.0, preferably in a range of 1.0 to 2.5, more preferably in a range of 1.0 to 1.5, and still more preferably in a range of 1.0 to 1.25. When the molecular weight distribution falls within the aforementioned range, due to the matter that the resulting copolymer is hardly influenced by hysteresis, the strength and elastic properties can be maintained even when used for a long period of time.

(Production Method of Aromatic Vinyl Compound-Conjugated Diene Copolymer)

The aromatic vinyl compound-conjugated diene copolymer can be produced through a liquid phase anionic polymerization method of using an organic alkali metal compound as a polymerization initiator in the presence of an inert gas and a solvent that is inert to the polymerization initiator.

The aromatic vinyl compound-conjugated diene copolymer can be controlled to a block structure by successively adding the conjugated diene or the aromatic vinyl compound in the presence of a polymerization initiator; can also be controlled to a random structure by adding a mixture composed of the conjugated diene and the aromatic vinyl compound; can also be controlled to a tapered structure by controlling an addition rate of each of the conjugated diene and the aromatic vinyl compound; and can also be controlled to a branched structure, such as a star structure, etc., by subjecting a growing terminal anion to coupling with a polyvalent organic group. In addition, on polymerizing a conjugated diene, in the case of allowing a Lewis base to coexist, the binding mode (for example, in the case of butadiene, a 1,2-binding unit and a 1,4-binding unit; and in the case of isoprene, a 1,2-binding unit, a 3,4-binding unit, and a 1,4-binding unit) can be controlled. The anionic polymerization can be terminated with a polymerization terminator which may have a function as a terminal modifier. That is, the copolymer in which such a structure is controlled can be used in the present invention.

Examples of the inert gas include a nitrogen gas, an argon gas, and a helium gas. Among them, a nitrogen gas is economically advantageous because it is not only readily available but also inexpensive.

Examples of the organic alkali metal compound include organic lithium compounds, such as methyllithium, ethyllithium, propyllithium, isopropyllithium, butyllithium, sec-butyllithium, tert-butyllithium, isobutyllithium, pentyllithium, hexyllithium, butadienyllithium, cyclohexyllithium, phenyllithium, benzyllithium, p-toluyllithium, styryllithium, trimethylsilyllithium, 1,4-dilithiobutane, 1,5-dilithiopentane, 1,6-dilithiohexane, 1,10-dilithiode cane, 1,1-dilithiodiphenylene, dilithiopolybutadiene, dilithiopolyisoprene, 1,4-dilithiobenzene, 1,2-dilithio-1,2-di phenyl ethane, 1,4-dilithi o-2-ethylcyclohexane, 1,3,5-trilithiobenzene, 1,3,5-trilithio-2,4,6-triethylbenzene, etc.; organic sodium compounds, such as methylsodium, ethyl sodium, n-propylsodium, isopropylsodium, n-butylsodium, sec-butyl sodium, tert-butyl sodium, isobutylsodium, phenylsodium, sodium naphthal ene, cyclopentadienylsodium, etc.; and the like. These organic alkali metal compounds may be used either alone or in combination of two or more thereof.

Among them, butyllithium, sec-butyllithium, and tert-butyllithium, each of which is readily industrially available, are preferred. These may be used either alone or in combination of two or more thereof As the solvent which is used for producing the aforementioned copolymer, preferred is a hydrocarbon in which water, a hydroxy compound, an alcohol, a ketone, etc. are removed, each of which deactivates the polymerization initiator. Examples thereof include saturated aliphatic hydrocarbons, such as butane, isobutane, pentane, isopentane, 2,2,4-trimethylpentane, hexane, heptane, isoheptane, octane, isooctane, nonane, decane, cyclopentane, cyclohexane, methylcyclopentane, ethylcyclohexane, cycloheptane, methylcycloheptane, etc.; and aromatic hydrocarbons, such as benzene, toluene, ethylbenzene, propylbenzene, butylbenzene, o-xylene, m-xylene, p-xylene, etc. These solvents may be used either alone or in combination of two or more thereof.

Among them, a solvent that is suitable for separating the solvent from the copolymer solution in the production method of the present invention as mentioned later is preferably used, and a saturated aliphatic hydrocarbon or a saturated alicyclic hydrocarbon having a boiling point of 30 to 100° C. is preferably used as the solvent. The "boiling point" as referred to in the present specification means a boiling point at atmospheric pressure (1 atm). Examples of the solvent whose boiling point at atmospheric pressure (1 atm) is 100° C. or lower include saturated aliphatic hydrocarbons, such as isopentane (27.9° C.), pentane (36.1° C.), cyclopentane (49.3° C.), hexane (68.7° C.), cyclohexane (80.7° C.), isoheptane (90° C.), heptane (98.4° C.), etc. Though these solvents may be used either alone or in combination of two or more thereof, it is preferred to contain, as a main component, any one selected from saturated aliphatic hydrocarbons or saturated alicyclic hydrocarbons having a boiling point of 30 to 100° C. in an amount of 80 mass % or more relative to the total weight of the polymerization solvent.

Among them, the solvent is more preferably at least one selected from cyclopentane, hexane, and cyclohexane. The case of using such a solvent is preferred from the standpoint that the matter that the solvent's boiling point is in a range of 50 to 100° C., thereby achieving an industrially advantageous polymerization rate and the matter that the heat energy necessary for separating the solvent from the copolymer is reduced can be made compatible with each other.

Examples of the Lewis base include ethers, such as dimethyl ether, diethyl ether, dipropyl ether, tetrahydrofuran, 1,2-dimethoxyethane, 1,2-diethoxyethane, 1,2-diisopropoxyethane, etc.; glycol ethers, such as ethylene glycol dimethyl ether, diethylene glycol dimethyl ether, etc.; amines, such as trimethylamine, triethylamine, N,N,N',N'-tetramethylethylenediamine, N,N,N',N'-tetraethyl ethylenediamine, N-methyl morpholine, etc.; and the like. These Lewis bases can be used either alone or in combination of two or more thereof. Among them, tetrahydrofuran is suitable from the standpoint of easiness of recovery of the Lewis base, and N,N,N',N'-tetramethylethylenediamine is suitable from the standpoint that the use amount can be decreased.

Examples of the polymerization terminator which may have a function as a terminal modifier include hydrogen; water; alcohols, such as methanol, ethanol, propanol, isopropanol, butanol, heptanol, cyclohexanol, phenol, benzyl alcohol, o-cresol, m-cresol, p-cresol, ethylene glycol, propylene glycol, butanediol, glycerin, catechol, etc.; halogen compounds, such as methyl chloride, methyl bromide, methyl iodide, ethyl chloride, ethyl bromide, ethyl iodide, butyl chloride, butyl bromide, butyl iodide, benzyl chloride, benzyl bromide, benzyl iodide, trimethylsilyl fluoride, trimethylsilyl chloride, trimethylsilyl bromide, trimethylsilyl iodide, triethylsilyl fluoride, triethylsilyl chloride, triethylsilyl bromide, triethylsilyl iodide, tributylsilyl fluoride, tributylsilyl chloride, tributylsilyl bromide, tributylsilyl iodide, triphenylsilyl fluoride, triphenylsilyl chloride, triphenylsilyl bromide, triphenylsilyl iodide, etc.; ketones, such as 2-heptanone, 4-methyl-2-pentanone, cyclopentanone, 2-hexanone, 2-pentanone, cyclohexanone, 3-pentanone, acetophenone, 2-butanone, acetone, etc.; esters, such as methyl acetate, ethyl acetate, butyl acetate, etc.; epoxy compounds, such as ethylene oxide, propylene oxide, etc.; and the like.

(Hydride)

In the production method of the present invention as mentioned later, a hydride having been hydrogenated through a hydrogenation reaction of the aforementioned copolymer can also be used. The hydride is one which can be, for example, produced by exerting a hydrogen molecule on the aforementioned copolymer solution having been subjected to polymerization termination in the presence of a hydrogenation catalyst, and an unsaturated bond derived from the conjugated diene or an aromatic ring derived from the aromatic vinyl compound can be hydrogenated within a desired range through this hydrogenation reaction.

Examples of the hydrogenation catalyst include ruthenium compounds, rhodium compounds, and the like. Examples of the ruthenium compound include halides, such as $RuCl_3$, $RuBr_3$, etc.; organic acid salts, such as $Ru(OAc)_3$, $Ru(OCOC_5H_{11})_3$, etc. (wherein Ac represents an acetyl group); acetylacetonate complexes, such as $Ru(acac)_3$, etc. (wherein acac represents an acetylacetonate group); triphenyl phosphine complexes, such as $RuCl_2(PPh_3)_3$, $RuCl_2(CO)_2(PPh_3)_2$, $RuClCp(PPh_3)_2$, $RuClH(PPh_3)_3$, $RuH_2(PPh_3)_4$, $RuClH(CO)(PPh_3)_3$, $RuH_2(CO)(PPh_3)_2$, etc. (wherein Cp represents a cyclopentadienyl group); and the like. Examples of the rhodium compound include halides, such as $RhCl_3$, $RhI_3$, etc.; carbonyl complexes, such as $[RhCl(CO)]_2$, $Rh_4(CO)_{12}$, $Rh_6(CO)_{16}$, etc.; organic acid salts, such as $Rh(OAc)_3$, $[Rh(OAc)_2]_2$, etc. (wherein Ac represents an acetyl group); acetylacetonate complexes, such as $Rh(acac)_3$, $Rh(acac)(CO)_2$, etc. (wherein acac represents an acetylacetonate group); cyclooctadiene complexes, such as $Rh(acac)(cod)$, $[Rh(OAc)(cod)]_2$, $[RhCl(cod)]_2$, etc. (wherein cod represents a cyclooctadienyl group); triphenyl phosphine complexes, such as $RhCl(CO)(PPh_3)_2$, $RhBr(CO)(PPh_3)_2$, $RhH(CO)(PPh_3)_3$, $RhCl(PPh_3)_3$, etc.; and the like.

A titanium compound can also be used as the hydrogenation catalyst. Examples of the titanium compound include compounds obtained through activation of a halide compound, such as bis(ethylcyclopentadienyl)titanium dichloride as a Tebbe complex, $CpTiCl_3$, $Cp_2TiCl_2$, $CpTiBr_3$, $Cp_2TiBr_2$, $Cp_2TiF_2$, etc. (wherein Cp represents a cyclopentadienyl group), with a reducing agent; and the like. Examples of the reducing agent include alkali metal hydrides, such as lithium hydride, sodium hydride, potassium hydride, etc.; organic alkali metal compounds, such as methyllithium, ethyllithium, propyllithium, isopropyllithium, butyllithium, sec-butyllithium, tert-butyllithium, isobutyllithium, pentyllithium, hexyllithium, butadienyllithium, cyclohexyllithium, phenyllithium, benzyllithium, p-toluyllithium, methyl sodium, ethyl sodium, n-propyl sodium, i sopropyl sodium, n-butyl sodium, sec-butylsodium, tert-butylsodium, isobutylsodium, phenylsodium, etc.; organic aluminum compounds, such as trimethylaluminum, triethylaluminum, tripropylaluminum, tributylaluminum, triisobutylaluminum, chlorodiethylaluminum, chlorodipropylaluminum, chlorodibutylaluminum, chlorodiisobutylaluminum, etc.; organic magnesium compounds, such as diethylmagnesium, di-n-propylmagnesium, diisopropylmagnesium, dibutylmagnesium, dihexylmagnesium, diphenylmagnesium, dibenzylmagnesium, etc.; silyl hydride compounds, such as methyldichlorosilane, ethyldichlorosilane, propyldichlorosilane, butyldichlorosilane, phenyldichlorosilane, dimethylchlorosilane, diethylchlorosilane, dipropylchlorosilane, dibutylchlorosilane, dipentylchlorosilane, dihexylchlorosilane, trimethylsilane, triethylsilane, tripropylsilane, tributylsilane, triphenylsilane, methylsilane, ethylsilane, propylsilane, butylsilane, phenylsilane, methyldiacetoxysilane, polymethylhydrosiloxane, polyethylhydrosiloxane, polypropylhydrosiloxane, polybutylhydrosiloxane, etc.; and the like.

Furthermore, compounds obtained through activation of a nickel compound which may contain water, or a cobalt compound which may contain water, with an organic aluminum compound can also be used as the hydrogenation catalyst. Examples of the nickel compound include nickel formate, nickel acetate, nickel propionate, nickel 2-ethylhexanoate, a nickel acetylacetonate complex, and the like; examples of the cobalt compound include cobalt formate, cobalt acetate, cobalt propionate, cobalt 2-ethylhexanoate, a cobalt acetylacetonate complex, and the like; and examples of the organic aluminum compound include trimethylaluminum, triethylaluminum, tripropylaluminum, tributylaluminum, triisobutylaluminum, and the like.

(Production Method of Copolymer (P))

The production method of the present invention is a method for producing a copolymer (P) including separating a solvent from a copolymer (P) solution containing at least one copolymer (P) selected from an aromatic vinyl compound-conjugated diene copolymer obtained by the aforementioned method, a hydride of the copolymer, and a mixture thereof, the solvent being a saturated aliphatic hydrocarbon solvent or a saturated alicyclic hydrocarbon solvent each having a boiling point of 30 to 100° C.; and the method including the following Steps A to C:

Step A: a step of regulating a solid component concentration (Ts) of the copolymer (P) solution to a range of ($5 \leq Ts \leq 60$) in terms of a mass %, Step B: a step of heating the copolymer (P) solution obtained in the Step A such that a temperature T (° C.) is in a range of $\{(225-1.9\times Ts)\leq T\leq(310-1.9\times Ts)\}$, and Step C: a step of discharging the copolymer (P) solution heated in the Step B from any one nozzle selected from a rotary wheel atomizer, a two-fluid nozzle atomizer, and a pressure nozzle atomizer at a linear velocity of 1 to 100 m/sec to separate the solvent in an inert gas stream at 0 to 200° C.

As for the copolymer (P) solution, the aromatic vinyl compound-conjugated diene copolymer is produced as mentioned previously, and the resulting copolymer solution may be used as it is, or if desired, the resulting copolymer solution may be concentrated or diluted and then used. In addition, a solution prepared by once separating the solvent used for the production from the aromatic vinyl compound-conjugated diene copolymer solution by a method, for example, coagulation, etc., to form a solid and then re-dissolving the solid in a solvent suitable for separation may also be used.

In the case where the copolymer (P) is a hydride of the aromatic vinyl compound-conjugated diene copolymer or a mixture of the aforementioned copolymer and the hydride, the hydride is produced in the presence of a solvent as mentioned previously, and the resulting solution containing the hydride or mixture may be used as it is, or if desired, the resulting solution containing the hydride or mixture may be concentrated or diluted and then used. In addition, a solution prepared by subjecting the solution containing the hydride to an extraction operation with an acidic aqueous solution or a basic aqueous solution as the need arises, followed by removing the catalyst component may also be used. In addition, a solution prepared by once separating the solvent used for the production by a method, for example, coagulation, etc., to form a solid and then re-dissolving the solid in a solvent suitable for separation may also be used.

In the case of using a mixture of two or more kinds of the aforementioned copolymers, the case of using a mixture of two or more kinds of the aforementioned hydrides, and the case of using a mixture of one or more kinds of the aforementioned copolymers and one or more kinds of the aforementioned hydrides, a mixture prepared by mixing solutions containing the same, respectively each other may be used; a mixture prepared by mixing a solution and a solid may be used; or a mixture prepared by mixing solids each other, followed by re-dissolving in a solvent suitable for separation of the solvent may be used.

(Solvent)

The solvent which is used for the production method of the present invention is a saturated aliphatic hydrocarbon or saturated alicyclic hydrocarbon solvent having a boiling point of 30 to 100° C. at atmospheric pressure (1 atm). Preferred examples of the solvent include isopentane (27.9° C.), pentane (36.1° C.), cyclopentane (49.3° C.), hexane (68.7° C.), cyclohexane (80.7° C.), isoheptane (90° C.), heptane (98.4° C.), and the like. (The numerical values in the parentheses are a boiling point at 1 atm.) These solvents may be used either alone or in combination of two or more thereof.

Among them, the solvent is more preferably at least one selected from cyclopentane, hexane, and cyclohexane. In the case of using such a solvent, the solvent's boiling point is in a range of 50 to 100° C., and the heat energy necessary for separating the solvent from the copolymer (P) solution can be reduced. In addition, in the case of using a mixed solvent, a mixed solvent containing 80 mass % or more of at least one selected from cyclopentane, hexane, and cyclohexane is preferred. Cyclohexane is especially preferred as the solvent.

Such a solvent may contain a Lewis base which is used in the polymerization reaction of the copolymer (P), a polymerization terminator which may have a function as a terminal modifier, and a hydrogenation catalyst which is used in the hydrogenation reaction within the range where the effects of the present invention are not impaired. Examples of the Lewis base, the polymerization terminator, and the hydrogenation catalyst, each of which may be contained in the solvent, include the same materials exemplified above for the production method of the aromatic vinyl compound-conjugated diene copolymer. In addition, the aforementioned solvent may also contain a solvent other than the saturated aliphatic hydrocarbon or saturated alicyclic hydrocarbon solvent having a boiling point of 30 to 100° C., which is used for the polymerization reaction and hydrogenation reaction of the copolymer (P), within the range where the effects of the present invention are not impaired. Examples of such other solvent include esters, such as methyl acetate, ethyl acetate, butyl acetate, etc.; ketones, such as butanone, acetone, etc.; and the like. The matter that the content of such other solvent is 5 mass % or less relative to the aforementioned solvent having a boiling point of 30 to 100° C. is preferred from the viewpoint of enhancing the solvent separating efficiency.

(Step A)

The present invention includes a step (Step A) of regulating a solid component concentration (Ts) of the copolymer (P) solution to a range of $(5\leq Ts\leq 60)$ in terms of a mass %. When the Ts falls within the aforementioned range, the solvent can be simply separated from the copolymer (P) solution. The Ts is more preferably in a range of $(10\leq Ts\leq 35)$ (mass %), and still more preferably in a range of $(10\leq Ts\leq 25)$ (mass %). When the Ts is 35 mass % or less, the copolymer (P) solution can be used without concentrating the copolymer (P) solution, and cleaning, etc. of a concentrated liquid intermediate storage tank is not necessary, and hence, such is economically preferred.

The copolymer (P) solution which is used in the present invention may be one containing only the copolymer (P) as the polymer component, or may be one containing other polymer than the copolymer (P) within the range where the effects of the present invention are not impaired. Examples of such other polymer include polydienes (e.g., polybutadiene, polyisoprene, polychloroprene, poly(2-ethylbutadiene), poly(2-butylbutadiene), etc.), ring-opening metathesis polymers of cycloolefins (e.g., polyoctenylene, polypentenylene, polynorbornene, etc.), polyethylene, polypropylene, polystyrene, a copolymer of ethylene and styrene, a copolymer of acrylonitrile and styrene, a copolymer of acrylonitrile, butadiene, and styrene, polyvinyl chloride, polyethylene terephthalate, polycarbonate, polyamides, polybutylene terephthalate, polyoxymethylene, polyacetal, polyphenylene ether, polyurethane, epoxy resins, polyacrylates, polyacrylate ether sulfones, polyarylate ether ketones, polyamide-imides, polyether-imides, and mixtures thereof, and the like. Though the content of such other polymer may be suitable so long as the solid component concentration (Ts) of a combination of the copolymer (P) and other polymer falls within the aforementioned range, it is preferably 50 mass % or less, more preferably 30 mass % or less, and still more preferably 10 mass % or less of the content of the copolymer (P).

(Overall Picture of Apparatus for Separating the Solvent from the Copolymer (P) Solution)

In the production method of the present invention, the separation of the solvent from the copolymer (P) solution can be, for example, carried out by using an apparatus as shown in FIG. 1. That is, a storage tank 1a is provided with a stirrer 2a, a jacket 3a, and an inert gas feed port 4a, and an immanent copolymer (P) solution 5a can be heated by using the jacket in the presence of an inert gas under pressure conditions under which the solvent does not volatilize while stirring. The copolymer (P) solution is fed into a pump 6a through pressurization with the inert gas. Subsequently, the copolymer (P) solution is heated to a desired temperature by a heater 7a and then discharged from a nozzle 8a. The pressure of the copolymer (P) solution in a section between the pump and the nozzle can be controlled by balance between a pressure increase by discharge from the pump and a pressure decrease by discharge from the nozzle. The nozzle 8a is connected with a takeout tank 9a, and the copolymer (P) heated to the desired temperature is discharged from the nozzle 8a in an inert gas stream. Due to the matter that the discharged copolymer (P) solution has a high temperature and a specified linear velocity, the solvent is promptly evaporated and separated from the copolymer (P). In the takeout tank 9a, an inert gas at 0 to 200° C. is continuously fed from an inert gas feed port 10a, and the solvent separated from the copolymer (P) solution is removed from an exhaust port 11a to the outside of the system together with the inert gas. A copolymer (P) 12a having been separated from the solvent is accumulated in a lower portion of the takeout tank 9a and can be continuously taken out from a transfer port 13a to the outside of the system.

The storage tank 1a is not particularly limited with respect to a structure thereof so long as it is able to store the copolymer (P) solution in an inert gas atmosphere and has a function to feed the copolymer (P) solution into the pump; however, it is preferred that the storage tank 1a has a stirrer, a jacket, and an inert gas feed port for stable feed into the pump.

In the storage tank 1a, the solid component concentration (Ts) of the copolymer (P) solution is regulated to an appropriate range as mentioned previously. In addition, a solution resulted from production of the copolymer (P) in the storage tank can also be used as it is.

A stirring blade connected in the stirrer 2a is not particularly limited, and examples thereof include a maxblend blade, a fullzone blade, a paddle blade, a propeller blade, a turbine blade, a fan turbine blade, a pfaudler blade, a brumargin blade, and the like. A combination of any two or more thereof may also be used. Especially, in the case where the viscosity of the copolymer (P) solution is high, use of a maxblend blade or a fullzone blade is preferred from the standpoint of feeding the copolymer (P) solution having stable temperature and viscosity into the pump 6a. Though a stirring method may be either upper stirring or lower stirring, the upper stirring blade is preferred from the standpoint of simplifying a cleaning operation of the apparatus and a maintenance checkup.

The jacket 3a is not particularly limited with respect to a structure thereof, and examples thereof include a full jacket type, a blowout nozzle-equipped jacket, a spiral baffle-equipped jacket, a split-coil type jacket, a two-stage type jacket, a dimple type jacket, an inner jacket, and the like. A combination of any two or more thereof may also be used. Especially, it is preferred to use a full jacket from the standpoints of a cleaning operation of the apparatus, a maintenance checkup, and apparatus costs. A heat transfer medium is not limited, and examples thereof include a heated oil, warm water, steam, and the like. Among them, steam is preferably used from the standpoints of easiness of temperature control, easiness of availability, and price.

The inert gas is not particularly limited, and examples thereof include a nitrogen gas, an argon gas, a helium gas, and the like. Among them, a nitrogen gas is preferred in view of the fact that it is not only readily available but also inexpensive. In the case where the pressure of the inert gas that pressurizes the copolymer (P) solution is lower than a saturated vapor pressure of the solvent, there is a case where a long-term residual material is generated due to attachment of the copolymer (P) onto an inner wall of the storage tank and incorporated into the product. On the other hand, the case where the pressure of the inert gas is too high leads to an increase of instrument costs to be caused due to an increase of withstand pressure of the storage tank. Accordingly, a total pressure of the inside of the storage tank in a pressurized state with the inert gas is preferably in a range of 0.1 to 5.0 MPaG; and more preferably in a range of 0.5 to 3.0 MPaG. In the present specification, the "MPaG" as the pressure expression means a gauge pressure.

The pump 6a is not particularly limited with respect to a kind thereof so long as it is a pump capable of subjecting the copolymer (P) solution to solution sending in a section between the pump and the nozzle at a discharge pressure higher than the saturated vapor pressure of the solvent, and examples thereof include a piston pump, a plunger pimp, a diaphragm pump, a gear pump, a vane pump, a screw pump, and the like. From the standpoint of subjecting a high-viscosity solution to solution sending, a plunger pump and a gear pump are preferred, and from the viewpoint of homogenizing the shape of the resulting copolymer (P), a plunger pump capable of discharging the copolymer (P) solution from the nozzle at a fixed temperature without causing a pulsating flow is more preferred for the use.

(Step B)

The present invention includes a step (Step B) of heating the copolymer (P) solution obtained in the Step A such that a temperature T (° C.) is in a range of $\{(225-1.9 \times Ts) \leq T \leq (310-1.9 \times Ts)\}$. In Step C as mentioned later, by discharging the copolymer (P) solution heated in the Step B from the nozzle at a linear velocity of 1 to 100 m/sec, the solvent is vaporized and separated, whereby the copolymer (P) can be obtained.

In view of the matter that a heat energy capable of vaporizing the solvent is required, the temperature T is preferably 130° C. or higher. In addition, in order to prevent heat decomposition of the copolymer (P) from occurring, the temperature T is preferably 300° C. or lower. That is, it is preferred to undergo the heating such that the temperature T (° C.) is in a range of $\{130 \leq (225-1.9 \times Ts) \leq T \leq (310-1.9 \times Ts) 300\}$.

As the solid component concentration (Ts) becomes higher, the amount of the solvent to be vaporized is decreased, and therefore, the heat energy necessary for the vaporization is reduced. From the foregoing viewpoint, in the case where the Ts is in a range of ($10 \leq Ts \leq 35$), the temperature T is preferably in a range of 170 to 275° C., and in the case where the Ts is in a range of ($10 \leq Ts \leq 25$), the temperature T is more preferably in a range of 200 to 275° C.

A heating method of the copolymer (P) solution is not particularly limited. For example, the heating may be performed by the storage tank 1a, or the heating may be performed by the heater 7a; however, it is preferred to perform the heating under a pressure under which the solvent is not volatilized. In the case of performing the heating using the storage tank 1a, there is a case where heat deterioration and discoloration of the copolymer (P) are caused due to the matter that the copolymer (P) solution is stored for a long time at a high temperature. Accordingly, from the viewpoint of inhibiting the heat deterioration and discoloration of the copolymer (P), it is preferred to perform the heating using the heater 7a. A heating time is preferably within 30 minutes, and more preferably within 10 minutes.

Examples of the heater 7a include a combustion heater, an electric heater, a heat exchange type heater, and the like, and a combination of any two or more thereof may also be used. It is preferred to use a heat exchange type heater from the standpoint of lowering the risk of a fire to be caused due to chemical leakage from a piping. Examples of a type to be used as the heat exchange type heater include a multi-tubular type, a hairpin type, a coil type, a double tube type, a plate type, a spiral type, and the like. Among them, a vertical multi-tubular type heater (shell-and-tube type heater) in which the copolymer (P) solution is allowed to pass into the tube side is preferred from the standpoint of easiness of cleaning. A heat transfer area of the vertical multi-tubular type heater can be set according to a temperature and a flow rate of the heat transfer medium, a flow amount of the copolymer (P) solution, and so on.

Prior to heating to the aforementioned temperature T by the heater 7a, preheating in the storage tank 1a may be performed. As a preheating temperature of the copolymer (P) solution is made higher, the feed of the copolymer (P) solution into the pump becomes stable due to a lowering of the solution viscosity. However, when the preheating temperature is too high, decomposition or discoloration with time of the copolymer (P) is caused, and hence, the preheating temperature is preferably in a range of 30 to 140° C., and more preferably in a range of 50 to 100° C.

(Step C)

The present invention includes a step (Step C) of discharging the copolymer (P) solution heated in the Step B from any one nozzle selected from a rotary wheel atomizer, a two-fluid nozzle atomizer, and a pressure nozzle atomizer at a linear velocity of 1 to 100 m/sec to separate the solvent in an inert gas stream at 0 to 200° C.

As any one nozzle selected from a rotary wheel atomizer, a two-fluid nozzle atomizer, and a pressure nozzle atomizer, ones incorporated into commercially available spray dryers from GEA, Inc. and so on can be used. In addition, the nozzle design is described in, for example, K. Masters: "*Spray Drying Handbook*", John Wiley and Sons, New York (1979), etc.

The rotary wheel atomizer is one for cutting the heated copolymer (P) solution by shearing of a rotary disk, and the size and distribution, and so on of particles of the copolymer (P) can be controlled by a rotation rate of the rotary disk.

The two-fluid nozzle atomizer is able to control the shape of the copolymer (P) obtained by feeding, as a high-speed gas, an inert gas or steam, or the like into the heated copolymer (P) solution from the outside. The two-fluid nozzle atomizer may be an internal mixing nozzle in which the inert gas or steam and the heated copolymer (P) solution are mixed under pressure prior to discharge, and the mixture is then discharged from the nozzle, or may be an external mixing nozzle in which the copolymer (P) solution is discharged from the nozzle and immediately thereafter, brought into contact with the inert gas or steam.

The pressure atomizer is a single-fluid atomizer in which the pressure of the heated copolymer (P) solution is converted into a kinetic energy to generate a fast relative velocity against the ambient gas. The atomizer with a simple opening is one for jetting the liquid at a high speed through a small round-shaped hole.

In such nozzles, the nozzle may be a single-hole nozzle having a single channel of the heated copolymer (P) solution, or may be a multi-hole nozzle having two or more channels of the heated copolymer (P) solution.

The copolymer (P) has such properties that it is hardly re-dissolved in a solvent vapor, and in the case of using a multi-hole nozzle, when one of the channels is once plugged, the pressure tends to increase in each channel, and on a long-term continuous operation, the shape of the obtained copolymer (P) changes with time. Accordingly, from the viewpoint of obtaining the copolymer (P) whose shape is stable in the long-term continuous operation, it is preferred to use a single-hole nozzle.

Among them, a pressure nozzle atomizer is more preferably used in view of the matter that a heated inert gas or steam is not necessary.

A diagrammatic view of a pressure nozzle atomizer is shown in FIG. 2. The pressure nozzle atomizer is configured of a stem 1b and a body 2b, and a copolymer (P) solution 3b passes through a gap between a disk of the tip of the stem 1b and a contact port 4b between the disk and the body and is subsequently discharged from a discharge port 5b into the takeout tank.

In the Step C, it is necessary to discharge the copolymer (P) solution from the nozzle at a linear velocity of 1 to 100 m/sec. In the present invention, the linear velocity on discharging the copolymer (P) solution from the nozzle (hereinafter sometimes referred to as "nozzle linear velocity") is defined as a maximum linear velocity in the case where the solution is considered to pass through a section between the contact port 4b of the disk with the body and the discharge port 5b. By discharging the heated copolymer (P) solution within the aforementioned range, the pressure of the copolymer (P) solution abruptly decreases after passing through the contact port 4b, and the solvent separation from the copolymer (P) solution is performed. The linear velocity is more preferably 1 to 50 m/sec, and still more preferably 3 to 30 m/sec. The linear velocity can be determined by a method described in the Examples.

From the viewpoint of controlling the linear velocity, it is more preferred that an opening degree of the nozzle tip can be regulated by an actuator according to an internal pressure of the piping. In addition, the pressure of the copolymer (P) solution immediately before it is discharged from the nozzle is preferably in a range of 0.5 to 50 MPaG, and more preferably in a range of 0.5 to 25 MPaG. So long as the pressure of the copolymer (P) solution falls within this range, the withstand pressure to be designed regarding each of the pump, the heater, and the nozzle can be decreased, and the equipment costs can be reduced.

Examples of a shape of the disk that is a tip portion of the stem 1b include a cone, an elliptic cone, a triangular pyramid, a quadrangular pyramid, a polygonal pyramid, a cylinder, an elliptic cylinder, a triangular prism, a quadrangular prism, a polygonal prism, and the like. From the standpoint of stabilizing the dimensions of a metal worked product, those mainly composed of a conical structure are preferred. Examples of a channel of the body 2b include a cone, an elliptic cone, a triangular pyramid, a quadrangular pyramid, a polygonal pyramid, a cylinder, an elliptic cylinder, a triangular prism, a quadrangular prism, a polygonal prism, a curved channel, and the like. From the standpoint of stabilizing the dimensions of a metal worked product, those mainly composed of a conical structure are preferred.

Examples of a nozzle configured of a disk having a cylindrical or conical shape, etc. and a body having a cylindrical or conical shape, etc. include nozzles 1c to 20c shown in FIG. 3. Examples of the body include shapes 1c to 8c. The body may be in a cylindrical shape, may be in a shape of constriction structure, or may be in a curved shape. Furthermore, the width and length of the channel are not limited. On the other hand, examples of the disk include shapes 9c to 15c. The disk may be in a conical shape or a curved surface shape, or may be in a shape in which a part of a cone or curved shape is cut, or the cut portion is joined with another shape. Furthermore, the width and length of the channel are not limited.

Among them, the shapes 16c to 20c, each having such a structure that when closing the nozzle, the disk and the body come into good contact with each other, are preferred. In the case of using a nozzle having such a structure, by allowing the stem to move up and down, it becomes possible to control the pressure and linear velocity relative to wide-ranging viscosity and flow rate of the copolymer (P) solution.

The aforementioned nozzle is connected with the takeout tank, and it vaporizes and separates the solvent from the copolymer (P) solution discharged from the nozzle tip and allows the copolymer (P) to drop toward the lower portion of the takeout tank, followed by taking out the copolymer (P) batchwise or continuously from the takeout tank to the outside of the system. The separation of the solvent is performed in an inert gas stream at 0 to 200° C. By lowering the solvent gas concentration within the takeout tank with the inert gas and also exhausting the solvent gas to the outside of the system, fusion among the resulting copolymers (P) can be inhibited. Accordingly, it is preferred that the takeout tank is provided with an inert gas feed port, an exhaust port of the gaseous solvent, and a carry-out port of the copolymer (P).

Though the nozzle installation position and the shape of the takeout tank are not particularly limited, from the standpoints of inhibiting fusion of the discharged copolymer (P) onto the inner wall of the takeout tank and reducing the amount of the inert gas used, a cylindrical shape having an inside diameter such that the copolymer (P) discharged from the nozzle does not come into direct contact with the inner wall of the takeout tank is preferred, and it is preferred that the nozzle is installed in the center of the top of the takeout tank.

Though the connection positions of the inert gas feed port and the exhaust port are not particularly limited, from the standpoint of inhibiting fusion among the copolymers (P), it is preferred that the inert gas feed port is installed in the lower portion of the takeout tank, whereas the exhaust port is installed in the upper portion of the takeout tank. In addition, from the standpoint of inhibiting fusion among the copolymers (P), it is more preferred that an air hole-provided flat board as a partition board or a funnel is installed between an accumulation portion of the copolymer (P) and a vapor phase portion, and the inert gas is allowed to pass in an upflow state from the underside thereof. The inert gas may be fed through a usual piping, may be fed so as to generate a gas stream, or may be used by generating a gas stream in a vapor phase portion by using a stirring blade separately installed in the inside of the takeout tank. Examples of the inert gas which can be used herein include a nitrogen gas, an argon gas, a helium gas, and the like. Among them, a nitrogen gas is preferred in view of the matter that it is not only easily available but also inexpensive.

Though a volume of the takeout tank is not particularly limited, a residence time of the inert gas is preferably 0.1 to 5 minutes, and from the viewpoints of reducing the amount of the inert gas used and inhibiting the fusion of the copolymer, it is preferred to regulate the volume of the takeout tank such that the residence time of the inert gas is in a range of 0.1 to 1 minute.

Though a temperature of the inert gas has only to be in a range of 0 to 200° C., it is preferably 10 to 120° C., more preferably 10 to 80° C., and still more preferably 10 to 50° C. In addition, the amount of the inert gas used is preferably in a range of 10 to 5,000 NL, and more preferably in a range of 50 to 2,000 NL in terms of an amount of the inert gas used per kg of the solvent of the copolymer (P) solution. The "NL" expresses a normal liter and means a volume of the inert gas at 0 MPaG and 0° C. and at a humidity of 0%.

Though an internal pressure of the takeout tank can be properly set, if desired, it is preferably 500 kPaG or less, and more preferably 100 kPaG or less.

(Transfer of Copolymer (P))

The copolymer (P) accumulated in the bottom can be transferred batchwise or continuously to the outside of the system. From the standpoint of inhibiting the fusion among the copolymers (P), it is preferred to continuously transfer the copolymer (P) by using, for example, a gas stream of an inert gas or the like, or an instrument, such as a conveyor, etc. The copolymer (P) may be transferred by using a gas stream of an inert gas or the like, or may be transferred by using an instrument, such as a conveyor, etc. In the case of using a gas stream of an inert gas or the like, a cyclone or a bag filter for separating the copolymer and the inert gas from each other is necessary, and therefore, it is more preferred economically to use a conveyor as a mechanical transfer machine.

In view of the fact that the copolymer (P) is transferred together with the gaseous solvent and the inert gas, it is preferred to use a closed type conveyor. Examples of the conveyor include a belt conveyor, a chain conveyor, a roller conveyor, a screw conveyor, a vibrating conveyor, an elevating conveyor, and the like. Among them, a screw conveyor is preferred from the standpoints of easiness of cleaning and maintenance checkup. The screw conveyor may be of either a horizontal type or a vertical type.

According to the production method of the present invention, the copolymer (P) can be obtained more simply with a less energy consumption without using hot water as in the conventional steam stripping method and without requiring a dehydration/drying step. An amount of the residual solvent contained in the resulting copolymer (P) is typically 2 mass % or less, and more preferably 1 mass % or less.

In the production method of the present invention, the copolymer (P) in a fibrous form is readily obtained. When the copolymer (P) is a fibrous copolymer, it is low in a bulk density and excellent in oil absorptivity, as compared with copolymers in a pellet shape or a crumb shape. The "fibrous copolymer" as referred to in the present invention means a copolymer having a shape in which a diameter is 0.1 mm or more, a length is 1 mm or more, and a ratio of the length to the diameter is 5 times or more, and preferably 10 times or more. The bulk density (g/mL) of the resulting fibrous copolymer is preferably 0.02 to 0.20 g/mL, and more preferably 0.05 to 0.15 g/mL from the viewpoint of excellent oil absorptivity. The "bulk density" means a value obtained in a manner of filling the copolymer in a container having an already-known volume and dividing the volume including voids by the mass of the copolymer. In addition, an oil absorption rate that is an indicator of the oil absorptivity is preferably 10 or more, and more preferably 12 or more.

The copolymer (P) may be crushed more finely, if desire, and the copolymer (P) may be charged into an extruder to convert into a porous pellet, or may be mixed with an oil or the like to convert into an oil-extended pellet.

The copolymer (P) obtained by the production method of the present invention can also be processed into a resin composition upon addition with other copolymer or an additive (e.g., a heat stabilizer, an ultraviolet absorber, an antioxidant, a flame retardant, a coloring agent, a lubricant, a release agent, a filler, etc.), if desired.

Such other polymer is not particularly limited and can be properly selected according to an application. Examples thereof include polydienes (e.g., polybutadiene, polyisoprene, polychloroprene, poly(2-ethylbutadiene), poly(2-butylbutadiene), etc.), ring-opening metathesis polymers of cycloolefins (e.g., polyoctenylene, polypentenylene, polynorbornene, etc.), polyethylene, polypropylene, polystyrene, a copolymer of ethylene and styrene, a copolymer of acrylonitrile and styrene, a copolymer of acrylonitrile, butadiene, and styrene, polyvinyl chloride, polyethylene terephthalate, polycarbonate, polyamides, polybutylene terephthalate, polyoxymethylene, polyacetal, polyphenylene ether, polyurethane, epoxy resins, polyacrylates, polyacrylate ether sulfones, polyarylate ether ketones, polyamide-imides, polyether-imides, and mixtures thereof, and the like.

Examples of the antioxidant include 2,5-di-tert-butylhydroquinone, 2,6-di-tert-butyl-p-cresol, 4,4'-thiobis(6-tert-butylphenol), 2,2'-methylene-bis(4-methyl-6-tert-butylphenol), octadecyl-3-(3',5'-di -tert-butyl-4'-hydroxyphenyl) propionate, 4,4'-thiobis(6-tert-butylphenol), 2-tert-butyl-6-(3-tert-butyl-2-hydroxy-5-methylbenzyl)-4-methylphenyl acrylate, pentaerythritol tetrakis(3-laurylthiopropionate), 2,6-di-(tert-butyl)-4-methylphenol, 2,2-methylenebis(6-tert-butyl-p-cresol), triphenyl phosphite, tris(nonylphenyl) phosphite, dilauryl thiodipropionate, and the like.

Examples of the flame retardant include metal salts of stannous acid, such as zinc stannate, zinc hydroxystannate, magnesium stannate, cobalt stannate, sodium stannate, potassium stannate, etc.; metal salts of boric acid, zinc borate, calcium borate, magnesium borate, etc.; antimony trioxide, antimony pentoxide, sodium antimonate, sodium oxide, tin oxide, zinc oxide, iron oxide, magnesium hydroxide, calcium hydroxide, kaolin clay, calcium carbonate, and the like.

Examples of the filler include silica, silica alumina, alumina, titanium oxide, zinc oxide, boron nitride, talc, mica, potassium titanate, calcium silicate, magnesium sulfate, aluminum borate, asbestos, glass beads, carbon black, graphite, molybdenum disulfide, polytetrafluoroethylene, and the like.

(Application)

The copolymer (P) which is obtained by the production method of the present invention is usable in fields of electric and electronic components, automotive components, various industrial components, daily necessities, and so on. In addition, in particular, in view of the fact that the hydride of the copolymer (P) has excellent properties in impact resilience and low-temperature properties, the hydride of the copolymer (P) is usable as a modifier for improving impact resistance, low-temperature properties, processability, and so on of thermoplastic resins, and for example, when combined with a liquid softening agent, such as an oil, etc., a plasticizer, and a thermoplastic resin, such as polypropylene, etc., the hydride of the copolymer (P) can be suitably used as a material for various industrial components, such as electrical wire cables, etc., automotive components, and so on.

EXAMPLES

The present invention is hereunder described in more detail by reference to the Examples, but it should be construed that the present invention is by no means limited by these Examples.

Chemicals used for production of copolymers are as follows.

Cyclohexane:
One prepared by dehydrating a stabilizer-free cyclohexane, manufactured by Wako Pure Chemical Industries, Ltd. with Molecular Sieves 3A and further bubbling with a nitrogen gas was used.

Sec-Butyllithium:
A cyclohexane solution of sec-butyllithium, manufactured by Nippon Aluminum Alkyls, Ltd., having a concentration of 1.32 mmol/g was used.

Isoprene:
Isoprene, manufactured by Kuraray Co., Ltd., from which moisture and a polymerization inhibitor were removed with Molecular Sieves 3A and neutral active alumina and then substituted with nitrogen, was used.

Styrene:
Stabilizer-containing styrene, manufactured by Wako Pure Chemical Industries, Ltd., from which moisture and a polymerization inhibitor were removed with neutral active alumina and then substituted with nitrogen, was used.

Nickel 2-ethylhexanonate:
A 2-ethylehexanoic acid solution of nickel(II) bis(2-ethylhexanoate), manufactured by Wako Pure Chemical Industries, Ltd., containing a nickel atom in an amount of 10 to 15 mass % as expressed in terms of a nickel metal was used as it was.

Triisobutylaluminum:
Triisobutylaluminum, manufactured by Nippon Aluminum Alkyls, Ltd. was used as it was.

Pentane:
One prepared by dehydrating a stabilizer-free pentane, manufactured by Wako Pure Chemical Industries, Ltd. with Molecular Sieves 3A and further bubbling with a nitrogen gas was used.

Oil:
Diana Process Oil PW90, manufactured by Idemitsu Petrochemical Co., Ltd. as a paraffin-based process oil was used as it was.

(Measurement of Molecular Weight and Molecular Weight Distribution of Copolymer)

A weight average molecular weight (Mw) and a molecular weight distribution (Ma/Mn) of a polymer obtained in each of the Examples and Comparative Examples were measured by means of gel permeation chromatography (hereinafter referred to as "GPC") and expressed in terms of standard polystyrene. The measurement conditions are as follows.

[GPC Analysis]

Apparatus: HLC-8320GPC EcoSEC System, manufactured by Tosoh Corporation

Sample: A solution of 5 mg of the polymer dissolved in 10 mL of tetrahydrofuran

Sample injection amount: 1 μL

Column: TSKgel SuperHZ4000, manufactured by Tosoh Corporation (4.6 mm in inside diameter×150 mm in length)

Column temperature: 40° C.

Eluent: Tetrahydrofuran

Flow rate of eluent: 1.0 mL/min

Detector: UV detector (detection wavelength: 254 nm)

Calibration curve: Prepared by standard polystyrene (Measurement of Hydrogenation Rate of Copolymer)

With respect to a copolymer obtained in each of the following Examples and Comparative Examples, the $^1$H-nuclear magnetic resonance spectroscopy (hereinafter abbreviated as "$^1$H-NMR analysis") was performed. The number of double bonds (mol) before hydrogenation relative to 1 mol of styrene can be calculated from an area integrated value of a styrene site of $^1$H-NMR of a copolymer not subjected to hydrogenation and an area integrated value of a conjugated diene double bond site. Similarly, the number of double bonds (mol) after hydrogenation of a hydrogenated copolymer having been subjected to hydrogenation relative to 1 mol of styrene can be calculated. A difference between the number of double bonds (mol) before hydrogenation and the number of double bonds (mol) after hydrogenation is the number of hydrogenated double bonds (mol), and mol % as a proportion of the number of hydrogenated double bonds (mol) to the number of double bonds (mol) before hydrogenation was defined as the hydrogenation rate (%). The measurement conditions are as follows.

[$^1$H-NMR Analysis]

Apparatus: AVANCE III 600US Plus, manufactured by Bruker BioSpin K.K.

Sample: A solution of 50 mg of the polymer dissolved in 1.0 g of deuterochloroform Standard substance: Tetramethylsilane Measurement temperature: 32° C. (305K)

Cumulative number: 256 times (Calculation Method of Nozzle Linear Velocity)

A nozzle linear velocity on discharging the copolymer (P) solution was determined in the following manner.

In a pressure nozzle atomizer used in each of the Examples and Comparative Examples, a conical disk is one prepared by cutting a cone having a cone angle of 11.4° and a bottom diameter of 5.58 mm at a position where the diameter is 0.42 mm, and a body is one having a shape coincident with the conical disk and being cut at a position where an opening having a diameter of 0.55 mm is formed in a tip portion thereof. A lifting distance of a stem is defined as a nozzle opening degree, and the nozzle opening degree $H$ (mm) and a cross-sectional area $S$ (mm$^2$) at which a maximum linear velocity is achieved were calculated from the structure of the pressure nozzle atomizer according the following equations.

When the nozzle opening degree is in a range of {0<(nozzle opening degree $H$ (mm))≤0.65}, then the cross-sectional areas $S$ (mm$^2$) is {(cross-sectional area $S$ (mm$^2$))=0.152×(nozzle opening degree $H$ (mm))+0.002}.

When the nozzle opening degree is in a range of {0.650≤(nozzle opening degree $H$ (mm))≤1.40}, then the cross-sectional areas $S$ (mm$^2$) is {(cross-sectional area $S$ (mm$^2$))=0.193×(nozzle opening degree $H$ (mm)) −0.029}.

When the nozzle opening degree is in a range of {1.40≤(nozzle opening degree $H$ (mm))}, then the cross-sectional areas $S$ (mm$^2$) is 0.240 mm$^2$.

The nozzle linear velocity (m/sec) was calculated from the above-obtained cross-sectional area $S$ (mm$^2$) and a solution flow rate $F$ (L/hr) of the copolymer (P) solution according to the following equation.

(Nozzle linear velocity (m/sec))=(Solution flow rate $F$ (L/hr)÷(Cross-sectional area $S$ (mm$^2$))÷3.6

(Amount of Residual Solvent)

With respect to an amount of a residual solvent contained in a fibrous copolymer obtained in each of the following Examples, a mass (g) after drying 10 g of an obtained fibrous copolymer at 0.1 Pa and 105° C. for one hour was weighed, a mass change (g) thereof was defined as an amount (g) of the residual solvent contained in the copolymer before drying, and a mass % of the amount (g) of the residual solvent relative to 10 g of the fibrous copolymer before drying was defined as an amount (mass %) of the residual solvent.

(Measurement of Diameter and Length of Fiber)

A diameter (mm) and a length (mm) of a fibrous copolymer obtained in each of the following Examples were measured by analyzing image digital information obtained by photographing a sample composed of a single fibrous copolymer with ADK-1100 (11 mega-pixel CCD camera), manufactured by Flovel Co., Ltd. by using Image-Pro Plus ver. 5.1, manufactured by Flovel Co., Ltd. Five samples of the fibrous copolymer having an average shape were measured, respectively, and average values thereof were adopted as a measured diameter (mm) and a measured length (mm), respectively.

(Bulk Density)

With respect to a bulk density of a copolymer obtained in each of the following Examples and Comparative Examples, the copolymer was filled up to a mark of 100 mL in a 100-mL metering cylinder having an already-known mass, a difference in mass before and after filling the copolymer was considered as a mass (g) of 100 mL of the copolymer, and a value obtained by dividing the mass (g) per 100 mL of the copolymer by a volume (100 mL) was defined as the bulk density (g/mL).

(Oil Absorption Rate)

An oil absorption rate of a copolymer obtained in each of the following Examples and Comparative Examples was determined by the following method. In a 500-mL beaker, Process Oil PW90 (300 g) was charged at 25° C., and subsequently, the copolymer (10 g) was charged and allowed to stand for 30 minutes, thereby impregnating with the Process Oil PW90. This was filtered with a 200-mesh nylon-made filter cloth and allowed to stand on the filter cloth for one hour. Thereafter, a mass (g) of the copolymer after oil absorption was weighed, and a value obtained by dividing this mass (g) of the copolymer after oil absorption by the mass (10 g) of the copolymer before oil absorption was defined as an oil absorption rate.

Example 1

After purging the inside of a SUS 316-made autoclave having a capacity of 20 liters with a nitrogen gas, which was equipped with an about 500-mL glass-made pressure bottle having a thermometer, an electric heater, an electromagnetic induction stirrer, a gas feed port, a sampling port, a raw material feed port, and a water-cooling type cooling tube installed therein, 9,501.2 g of cyclohexane was added, and the temperature was elevated to 70° C. over 30 minutes while stirring at 500 rpm. Subsequently, 58.1 g of a cyclohexane solution of 1.33 mmol/g of sec-butyllithium (77.2 mmol as sec-butyllithium) was forcedly fed with a nitrogen gas, and immediately thereafter, 470.6 g (4.5 mol) of styrene was forcedly fed with a nitrogen gas. A total pressure was 0.3 MPaG. The styrene was polymerized at a liquid temperature of 70 to 80° C. for one hour. Subsequently, 2,194.5 g (32.2 mol) of isoprene was forcedly fed with a nitrogen gas over one hour, and the contents were further allowed to react with each other for 1.5 hours. A total pressure was 0.4 MPaG, and a liquid temperature was 70 to 80° C. Thereafter, 470.6 g (4.5 mol) of styrene was forcedly fed with a nitrogen gas, and the contents were polymerized for one hour. A total pressure was 0.5 MPaG, and a liquid temperature was 70 to 80° C. Thereafter, 4.00 g of a cyclohexane solution of 20.0 mmol/g of ethanol (80.0 mmol as ethanol) was forcedly fed with a nitrogen gas to terminate the polymerization, followed by cooling to 20° C. There was thus obtained a copolymer solution.

After substituting the copolymer solution with hydrogen, the resultant was pressurized to 0.9 MPaG with hydrogen, and the temperature was elevated to 70° C. over 30 minutes while stirring at 500 rpm. On the other hand, in a one-liter three-necked flask purged with nitrogen, 25.1 g of a 2-ethylhexanoic acid solution of nickel(II) bis(2-ethylhexanoate) (42.8 to 64.1 mmol as a nickel atom) was dissolved in 284.4 g of cyclohexane, 31.8 g (160.3 mmol) of triisobutylaluminum was added over 10 minutes, and the contents were stirred for 30 minutes, thereby preparing a nickel catalyst.

To the copolymer solution at 70° C. which had been pressurized to 0.9 MPaG with a hydrogen gas, the aforementioned nickel catalyst was added over 2 hours, and the reaction was further performed for 4 hours. Subsequently, the resultant was cooled to 50° C., and the inside of the flask was then purged with nitrogen. An operation of adding a 30% hydrogen peroxide aqueous solution and a 10% citric acid aqueous solution thereto, performing stirring for 15 minutes, subsequently allowing to stand for 15 minutes, and then extracting an aqueous phase was repeated three time. Thereafter, an operation of adding water, performing stirring for 15 minutes, subsequently allowing to stand for 15 minutes, and then extracting an aqueous phase was further repeated three time. There was thus obtained a hydrogenated block copolymer solution from which the catalyst had been removed. The hydrogenated block copolymer contained in this hydrogenated block copolymer solution is abbreviated as "copolymer A".

5 g of the copolymer solution A was dried at 60° C. for one hour. The GPC analysis revealed that the copolymer A had a monomodal peak, a weight average molecular weight Mw of 44,400, and a molecular weight distribution Mw/Mn of 1.02.

A total molar number of isoprene of the copolymer A relative to a total molar number of styrene is clear from the amounts of the chemicals charged for polymerization, whereas a molar number of the non-hydrogenated double bond derived from isoprene of the copolymer A relative to a total molar number of styrene is clear from the $^1$H-NMR analysis. Thus, it was noted from this that the hydrogenation rate as a proportion of the material hydrogenated with the double bond derived from isoprene was 98.7%.

In addition, in view of the charged amounts, the copolymer A was a (15.0 mass % of styrene block)/(70.0 mass % of hydrogenated isoprene block)/(15.0 mass % of styrene block) copolymer, and the solution of the copolymer A contained 24.7 mass % of the copolymer A.

For the production of the copolymer from the copolymer solution, an apparatus shown in FIGS. 4 and 5 was used.

The 20-liter autoclave used for the polymerization and hydrogenation was used as a storage tank 1d. Nitrogen was fed from a nitrogen feed port 2d and pressurized to 0.5 MPaG, and a copolymer solution was heated to 70° C. by using a steam jacket 5d while stirring at 200 rpm with a stirrer 4d.

A preheated copolymer solution 7d was subjected to solution sending to a plunger pump 8d, passed through an electric heater 9d heated at 240° C. at a solution flow rate of 7.3 L/hr by using a pump 8d, and then discharged from a pressure nozzle atomizer 12d, thereby separating the solvent.

In view of the fact that the nozzle opening degree was 0.8 mm, the nozzle linear velocity was 16.2 m/sec, the solution pressure at a pressure gauge 10d was 3.4 MPaG, and the solution temperature at a thermometer 11d was 234° C.

From an inert gas feed port 15d, nitrogen at 27° C. was fed at a rate of 23.4 NL/min, namely in a nitrogen amount of 330 NL/kg per kg of the solvent, and a gas composed of this nitrogen and the solvent vapor was exhausted from an exhaust port 16d to the outside of the system. The internal pressure of the takeout tank was 16 kPaG at a pressure gauge 17d, and the internal temperature of the top of the takeout tank was 89.5° C. at a thermometer 18d.

The operation was performed for 30 minutes to obtain a fibrous copolymer A 19d. A partition was provided at a knife gate valve 20d, and a recovery container 21d was then separated to obtain the fibrous copolymer A.

The GPC analysis revealed that the fibrous copolymer A had a weight average molecular weight Mw of 44,400 and a molecular weight distribution Mw/Mn of 1.02, and thus, no change before and after the solvent removal was observed. The amount of the residual solvent was 0.43 mass %. The fiber of the fibrous copolymer A had a diameter of 0.12 mm and a length of 1.73 mm. The bulk density was 0.05 g/mL. The oil absorption rate was 13.3. The results are summarized in Table 1.

Example 2

A solution containing 24.7 mass % of the copolymer A was produced in the same method as in Example 1, and 3,640 g of cyclohexane was then distilled off, thereby obtaining a copolymer solution containing 34.6 mass % of the copolymer A. The copolymer solution was passed through the electric heater at a solution flow rate of 7.3 L/hr by using the pump and then discharged from the pressure nozzle atomizer in the same manner as in Example 1. In view of the fact that the nozzle opening degree was 1.2 mm, the nozzle linear velocity was 10.0 m/sec, a solution pressure was 2.5 MPaG, and a solution temperature was 232° C. From the inert gas feed port, nitrogen at 27° C. was fed at a rate of 23.4 NL/min, namely in a nitrogen amount of 380 NL/kg per kg of the solvent, and a gas composed of this nitrogen and the solvent vapor was exhausted from the exhaust port to the outside of the system. The internal pressure of the takeout tank was 17 kPaG, and the internal temperature of the top of the takeout tank was 92.5° C. The operation was performed for 30 minutes to obtain a fibrous copolymer A.

The amount of the residual solvent was 0.93 mass %. The fiber of the fibrous copolymer A had a diameter of 0.11 mm and a length of 1.68 mm. The bulk density was 0.06 g/mL. The oil absorption rate was 13.5. The results are summarized in Table 1.

Example 3

A copolymer solution containing 34.6 mass % of the copolymer A was produced in the same method as in Example 2. The copolymer solution was passed through the electric heater at a solution flow rate of 5.8 L/hr by using the pump and then discharged from the pressure nozzle atomizer in the same manner as in Example 1. In view of the fact that the nozzle opening degree was 0.93 mm, the nozzle linear velocity was 10.8 m/sec, the solution pressure was 3.3 MPaG, and the solution temperature was 234° C. From the inert gas feed port, nitrogen at 27° C. was fed at a rate of 23.4 NL/min, namely in a nitrogen amount of 460 NL/kg per kg of the solvent, and a gas composed of this nitrogen and the solvent vapor was exhausted from the exhaust port to the outside of the system. The internal pressure of the takeout tank was 18 kPaG, and the internal temperature of the top of the takeout tank was 87.5° C. The operation was performed for 30 minutes to obtain a fibrous copolymer A.

The amount of the residual solvent was 0.49 mass %. The fiber of the fibrous copolymer A had a diameter of 0.13 mm and a length of 2.89 mm. The bulk density was 0.05 g/mL. The oil absorption rate was 14.5. The results are summarized in Table 1.

Example 4

A copolymer solution was discharged from the pressure nozzle atomizer in the same method as in Example 3. From the inert gas feed port, nitrogen at 107° C. was fed at a rate of 7.0 NL/min, namely in a nitrogen amount of 140 NL/kg per kg of the solvent, and a gas composed of this nitrogen and the solvent vapor was exhausted from the exhaust port to the outside of the system. The internal pressure of the takeout tank was 7 kPaG, and the internal temperature of the top of the takeout tank was 92.0° C. The operation was performed for 30 minutes to obtain a fibrous copolymer A.

The amount of the residual solvent was 0.21 mass %. The fiber of the fibrous copolymer A had a diameter of 0.47 mm and a length of 200 mm or more. The bulk density was 0.10 g/mL. The oil absorption rate was 13.8. The results are summarized in Table 1.

Example 5

A solution containing 24.7 mass % of the copolymer A was produced in the same method as in Example 1, and 6,530 g of cyclohexane was then distilled off, thereby obtaining a copolymer solution containing 50.9 mass % of the copolymer A. The copolymer solution was passed through the electric heater at a solution flow rate of 5.0 L/hr by using the pump and then discharged from the pressure nozzle atomizer in the same manner as in Example 1. In view of the fact that the nozzle opening degree was 1.94 mm, the nozzle linear velocity was 5.8 m/sec, the solution pressure was 3.2 MPaG, and the solution temperature was 209° C. From the inert gas feed port, nitrogen at 27° C. was fed at a rate of 23.4 NL/min, namely in a nitrogen amount of 730 NL/kg per kg of the solvent, and a gas composed of this nitrogen and the solvent vapor was exhausted from the exhaust port to the outside of the system. The internal pressure of the takeout tank was 12 kPaG, and the internal temperature of the top of the takeout tank was 96.2° C. The operation was performed for 30 minutes to obtain a fibrous copolymer A.

The amount of the residual solvent was 0.57 mass %. The fiber of the fibrous copolymer A had a diameter of 0.44 mm and a length of 4.39 mm. The bulk density was 0.04 g/mL. The oil absorption rate was 11.3. The results are summarized in Table 1.

Example 6

The apparatus was operated for 2 hours in the same method as in Example 1, thereby obtaining about 2.8 kg of a fibrous copolymer A. In a 20-liter autoclave, 5,700.0 g of pentane was charged, and subsequently, 2,500 g of the obtained fibrous copolymer A was charged. The contents were stirred at 200 rpm with nitrogen at a total pressure of 0.5 MPaG and a liquid temperature of 80° C. for 10 hours, thereby obtaining a copolymer solution containing 30.6 mass % of the copolymer A.

The copolymer solution was passed through the electric heater at a solution flow rate of 7.3 L/hr by using the pump and then discharged from the pressure nozzle atomizer in the same manner as in Example 1. In view of the fact that the nozzle opening degree was 0.80 mm, the nozzle linear velocity was 16.2 m/sec, the solution pressure was 4.0 MPaG, and the solution temperature was 174° C. From the inert gas feed port, nitrogen at 33° C. was fed at a rate of 23.2 NL/min, namely in a nitrogen amount of 440 NL/kg per kg of the solvent, and a gas composed of this nitrogen and the solvent vapor was exhausted from the exhaust port to the outside of the system. The internal pressure of the takeout tank was 39 kPaG, and the internal temperature of the top of the takeout tank was 68.2° C. The operation was performed for 30 minutes to obtain a fibrous copolymer A.

The amount of the residual solvent was 0.08 mass %. The fiber of the fibrous copolymer A had a diameter of 0.12 mm and a length of 2.47 mm. The bulk density was 0.07 g/mL. The oil absorption rate was 12.9. The results are summarized in Table 1.

TABLE 1

| | Example | 1 | 2 | 3 | 4 | 5 | 6 |
|---|---|---|---|---|---|---|---|
| | Polymer (P) | A | A | A | A | A | A |
| | Solvent | Cyclohexane | Cyclohexane | Cyclohexane | Cyclohexane | Cyclohexane | Pentane |
| Step A | Solid component concentration (Ts, mass %) | 24.7 | 34.6 | 34.6 | 34.6 | 50.9 | 30.6 |
| Step B | Solution pressure (MPaG) | 3.4 | 2.5 | 3.3 | 3.3 | 3.2 | 4.0 |
| | Solution temperature (T, ° C.) | 234 | 232 | 234 | 234 | 209 | 174 |
| Step C | Solution flow rate (L/hr) | 7.3 | 7.3 | 5.8 | 5.8 | 5.0 | 7.3 |
| | Nozzle opening degree (mm) | 0.80 | 1.20 | 0.93 | 0.93 | 1.94 | 0.80 |
| | Nozzle linear velocity (m/sec) | 16.2 | 10.0 | 10.8 | 10.8 | 5.8 | 16.2 |
| | Nitrogen temperature (° C.) | 27.0 | 27.0 | 27.0 | 107 | 27.0 | 33.0 |
| | Nitrogen flow rate (NL/min) | 23.4 | 23.4 | 23.4 | 7.0 | 23.4 | 23.2 |
| | Amount of nitrogen used per kg of solvent (NL/kg) | 330 | 380 | 460 | 140 | 730 | 440 |
| | Internal pressure of takeout tank (kPaG) | 16 | 17 | 18 | 7 | 12 | 39 |
| | Internal temperature of top of takeout tank (° C.) | 89.5 | 92.5 | 87.5 | 92.0 | 96.2 | 68.2 |
| Physical properties of obtained polymer | Amount of residual solvent (mass %) | 0.43 | 0.93 | 0.49 | 0.21 | 0.57 | 0.08 |
| | Shape | Fibrous | Fibrous | Fibrous | Fibrous | Fibrous | Fibrous |
| | Fiber diameter (mm) | 0.12 | 0.11 | 0.13 | 0.47 | 0.44 | 0.12 |
| | Fiber length (mm) | 1.73 | 1.68 | 2.89 | 200 or more | 4.39 | 2.57 |
| | Bulk density (g/mL) | 0.05 | 0.06 | 0.05 | 0.10 | 0.04 | 0.07 |
| | Oil absorption rate (g/g) | 13.3 | 13.5 | 14.5 | 13.8 | 11.3 | 12.9 |

According to Example 1, it is noted that the copolymer solution produced through polymerization and hydrogenation by using cyclohexane can be used for the production method of the present invention as it is.

According to Examples 1 to 5, by using the cyclohexane solvent having a boiling point of 80.7° C. and undergoing the Steps A to C, the copolymers in which the amount of the residual solvent is low, the bulk density is small, and the oil absorption rate is excellent are obtained more simply with a less energy consumption as compared with the conventional method.

According to Example 6, even in the case of using pentane having a boiling point of 36.1° C. as the solvent, by the production method of the present invention, the copolymer in which the amount of the residual solvent is low, the bulk density is small, and the oil absorption rate is excellent are obtained more simply with a less energy consumption as compared with the conventional method.

Example 7

By using a hydrogenated diblock copolymer having a crumb shape, which was obtained by producing a diblock polymer through anionic polymerization of styrene and isoprene and hydrogenating this, followed by steam stripping (the hydrogenated diblock copolymer will be hereinafter referred to as "copolymer B"), a copolymer solution was prepared in the following manner and then subjected to the production method of the present invention. The copolymer B was composed of 38 mass % of a styrene block and 62 mass % of a hydrogenated isoprene block and had a hydrogenation rate of 98% or more, a weight average molecular weight Mw of 127,000, a molecular weight distribution Mw/Mn of 1.04, and a bulk density of 0.38 g/mL.

In a 20-liter autoclave, 8,111.1 g of cyclohexane was charged, and subsequently, 3,000 g of the copolymer B was charged. The contents were stirred at 200 rpm with nitrogen at a total pressure of 0.5 MPaG and a liquid temperature of 80° C. for 5 hours, thereby obtaining a copolymer solution containing 27.0 mass % of the copolymer B.

The copolymer solution was passed through the electric heater at a solution flow rate of 5.8 L/hr by using the pump and then discharged from the pressure nozzle atomizer in the same manner as in Example 1. In view of the fact that the nozzle opening degree was 1.13 mm, the nozzle linear velocity was 8.5 m/sec, the solution pressure was 3.3 MPaG, and the solution temperature was 222° C. From the inert gas feed port, nitrogen at 27° C. was fed at a rate of 23.0 NL/min, namely in a nitrogen amount of 420 NL/kg per kg of the solvent, and a gas composed of this nitrogen and the solvent vapor was exhausted from the exhaust port to the outside of the system. The internal pressure of the takeout tank was 16 kPaG, and the internal temperature of the top of the takeout tank was 93.3° C. The operation was performed for 30 minutes to obtain a fibrous copolymer B.

The amount of the residual solvent was 0.60 mass %. The fiber of the fibrous copolymer B had a diameter of 0.13 mm and a length of 1.36 mm. The bulk density was 0.09 g/mL. The oil absorption rate was 13.9. The results are summarized in Table 2.

Example 8

By using a hydrogenated triblock copolymer having a crumb shape, which was obtained by producing a triblock polymer through anionic polymerization of styrene, a mixture of isoprene and butadiene, and styrene in this order and hydrogenating this, followed by steam stripping (the hydrogenated triblock copolymer will be hereinafter referred to as "copolymer C"), a copolymer solution was prepared in the following manner and then subjected to the production method of the present invention. The copolymer C was composed of 30 mass % of a styrene block and 70 mass % of a hydrogenated isoprene/butadiene copolymer block and had a hydrogenation rate of 98% or more, a weight average molecular weight Mw of 88,000, a molecular weight distribution Mw/Mn of 1.03, and a bulk density of 0.28 g/mL.

In a 20-liter autoclave, 7,101.0 g of cyclohexane was charged, and subsequently, 3,000 g of the copolymer C was charged. The contents were stirred at 200 rpm with nitrogen at a total pressure of 0.5 MPaG and a liquid temperature of 80° C. for 5 hours, thereby obtaining a copolymer solution containing 29.7 mass % of the copolymer C.

The copolymer solution was passed through the electric heater at a solution flow rate of 5.8 L/hr by using the pump and then discharged from the pressure nozzle atomizer in the same manner as in Example 1. In view of the fact that the nozzle opening degree was 1.74 mm, the nozzle linear velocity was 6.7 m/sec, the solution pressure was 3.3 MPaG, and the solution temperature was 234° C. From the inert gas feed port, nitrogen at 27° C. was fed at a rate of 23.3 NL/min, namely in a nitrogen amount of 440 NL/kg per kg of the solvent, and a gas composed of this nitrogen and the solvent vapor was exhausted from the exhaust port to the outside of the system. The internal pressure of the takeout tank was 13 kPaG, and the internal temperature of the top of the takeout tank was 94.0° C. The operation was performed for 30 minutes to obtain a fibrous copolymer C.

The amount of the residual solvent was 1.61 mass %. The fiber of the fibrous copolymer C had a diameter of 0.16 mm and a length of 3.69 mm. The bulk density was 0.05 g/mL. The oil absorption rate was 13.4. The results are summarized in Table 2.

Example 9

By using a hydrogenated triblock copolymer having a crumb shape, which was obtained by producing a triblock polymer through anionic polymerization of styrene, butadiene, and styrene in this order and hydrogenating this, followed by steam stripping (the hydrogenated triblock copolymer will be hereinafter referred to as "copolymer D"), a copolymer solution was prepared in the following manner and then subjected to the production method of the present invention. The copolymer D was composed of 34 mass % of a styrene block and 66 mass % of a hydrogenated butadiene block and had a hydrogenation rate of 98% or more, a weight average molecular weight Mw of 280,000, a molecular weight distribution Mw/Mn of 1.07, and a bulk density of 0.28 g/mL.

In a 20-liter autoclave, 11,888.8 g of cyclohexane was charged, and subsequently, 2,000 g of the copolymer D was charged. The contents were stirred at 200 rpm with nitrogen at a total pressure of 0.5 MPaG and a liquid temperature of 80° C. for 5 hours, thereby obtaining a copolymer solution containing 14.4 mass % of the copolymer D.

The copolymer solution was passed through the electric heater at a solution flow rate of 8.2 L/hr by using the pump and then discharged from the pressure nozzle atomizer in the same manner as in Example 1. In view of the fact that the nozzle opening degree was 1.14 mm, the nozzle linear velocity was 11.9 m/sec, the solution pressure was 3.8 MPaG, and the solution temperature was 243° C. From the inert gas feed port, nitrogen at 77° C. was fed at a rate of 23.3 NL/min, namely in a nitrogen amount of 260 NL/kg per kg of the solvent, and a gas composed of this nitrogen and the solvent vapor was exhausted from the exhaust port to the outside of the system. The internal pressure of the takeout tank was 17 kPaG, and the internal temperature of the top of the takeout tank was 92.1° C. The operation was performed for 30 minutes to obtain a fibrous copolymer D.

The amount of the residual solvent was 1.98 mass %. The fiber of the fibrous copolymer D had a diameter of 0.14 mm and a length of 200 mm or more. The bulk density was 0.08 g/mL. The oil absorption rate was 12.7. The results are summarized in Table 2.

Comparative Example 1

The bulk density of the copolymer B (in a crumb shape) was 0.38 g/mL, and as a result of measuring the oil absorption rate, it was found to be 9.8. The results are summarized in Table 3.

Comparative Example 2

The bulk density of the copolymer C (in a crumb shape) was 0.28 g/mL, and as a result of measuring the oil absorption rate, it was found to be 5.0. The results are summarized in Table 3.

Comparative Example 3

The bulk density of the copolymer D (in a crumb shape) was 0.28 g/mL, and as a result of measuring the oil absorption rate, it was found to be 6.3. The results are summarized in Table 3.

TABLE 2

| | Example | 7 | 8 | 9 |
|---|---|---|---|---|
| Copolymer | | B | C | D |
| Polymer molecular structure | | Diblock | Triblock | Triblock |
| Solvent | | Cyclo-hexane | Cyclo-hexane | Cyclo-hexane |
| Step A | Solid component concentration (Ts, mass %) | 27.0 | 29.7 | 14.4 |
| Step B | Solution pressure (MPaG) | 3.3 | 3.3 | 3.8 |
| | Solution temperature (T, ° C.) | 222 | 234 | 243 |
| Step C | Solution flow rate (L/hr) | 5.8 | 5.8 | 8.2 |
| | Nozzle opening degree (mm) | 1.13 | 1.74 | 1.14 |
| | Nozzle linear velocity (m/sec) | 8.5 | 6.7 | 11.9 |
| | Nitrogen temperature (° C.) | 27.0 | 27.0 | 77 |
| | Nitrogen flow rate (NL/min) | 23.0 | 23.3 | 23.3 |
| | Amount of nitrogen used per kg of solvent (NL/kg) | 420 | 440 | 260 |
| | Internal pressure of takeout tank (kPaG) | 16 | 13 | 17 |
| | Internal temperature of top of takeout tank (° C.) | 93.3 | 94.0 | 92.1 |

TABLE 2-continued

| | Example | 7 | 8 | 9 |
|---|---|---|---|---|
| Physical properties of obtained polymer | Amount of residual solvent (mass %) | 0.60 | 1.61 | 1.98 |
| | Shape | Fibrous | Fibrous | Fibrous |
| | Fiber diameter (mm) | 0.13 | 0.16 | 0.14 |
| | Fiber length (mm) | 1.36 | 3.69 | 200 or more |
| | Bulk density (g/mL) | 0.09 | 0.05 | 0.08 |
| | Oil absorption rate (g/g) | 13.9 | 13.4 | 12.7 |

TABLE 3

| | Comparative Example | 1 | 2 | 3 |
|---|---|---|---|---|
| Polymer | | B | C | D |
| Solvent separation method from polymer solution | | Steam stripping | Steam stripping | Steam stripping |
| Physical properties of obtained polymer | Shape | Crumb | Crumb | Crumb |
| | Bulk density (g/mL) | 0.38 | 0.28 | 0.28 |
| | Oil absorption rate (g/g) | 9.8 | 5.0 | 6.3 |

According to Examples 7 to 9, it is noted that the present invention is applicable to copolymers of various molecular structures. In addition, according to Examples 7 to 9 and Comparative Examples 1 to 3, the copolymers obtained by the production method of the present invention are higher in the oil absorption rate than the copolymers having a crumb shape.

INDUSTRIAL APPLICABILITY

In accordance with the production method of the present invention, by removing a solvent from a solution of each of an aromatic vinyl compound-conjugated diene-based copolymer and a hydride thereof in a simple manner with a less energy consumption without requiring a dehydration-drying process, a copolymer with a high oil absorption rate can be produced, and the obtained copolymer can be suitably used for the aforementioned various applications.

REFERENCE SIGNS LIST

<FIG. 1>
1a: Storage tank
2a: Stirrer
3a: Jacket
4a: Inert gas feed port
5a: Copolymer (P) solution
6a: Pump
7a: Heater
8a: Nozzle
9a: Takeout tank
10a: Inert gas feed port
11a: Exhaust port
12a: Copolymer (P)
13a: Transfer port
<FIG. 2>
1b: Stem, a tip of which is referred to as a disk
2b: Body
3b: Heated copolymer solution
4b: Contact port between disk and body
5b: Discharge port <FIG. 4>
1d: 20-liter autoclave as a storage tank
2d: Nitrogen feed port
3d: Charge port of solvent and copolymer
4d: Stirrer
5d: Steam jacket
6d: Thermometer
7d: Copolymer solution
8d: Plunger pump
9d: Electric heater
10d: Pressure gauge for measuring the pressure of the heated copolymer solution
11d: Thermometer for measuring the temperature of the heated copolymer solution
12d: Pressure nozzle atomizer
13d: Takeout tank
14d: Heat insulating material
15d: Inert gas feed port
16d: Exhaust port
17d: Pressure gauge for measuring the internal pressure of the takeout tank
18d: Thermometer for measuring the internal temperature of the top of the takeout tank
19d: Copolymer
20d: Knife gate valve
21d: Copolymer recovery container <FIG. 5>
1e: Stem
2e: Packing for preventing leakage of heated copolymer solution
3e: Screw for rising and falling of the stem
4e: Handle for rising and falling of the stem
5e: Heated copolymer solution
6e: Conical disk
7e: Body for grounding with the conical disk without substantial gap
8e: Bottom diameter of the conical disk and is 5.58 mm
9e: Cone angle of the conical disk and is 11.4°
10e: The tip of conical disk is cut at a position where the diameter is 0.42 mm
11e: The body tip has an opening having a diameter of 0.55 mm

The invention claimed is:

1. A method for producing a copolymer (P), comprising separating a solvent contained in a copolymer (P) solution to obtain the copolymer (P),
the copolymer (P) being at least one copolymer selected from the group consisting of an aromatic vinyl compound-conjugated diene copolymer comprising at least one conjugated diene and at least one aromatic vinyl compound and having a weight average molecular weight of 10,000 to 1,000,000, a hydride of the copolymer, and a mixture thereof;
the solvent being a saturated aliphatic hydrocarbon solvent or a saturated alicyclic hydrocarbon solvent each having a boiling point of 30 to 100° C.,
the method comprising:
regulating a solid component concentration (Ts) of the copolymer (P) solution to a range of (5≤Ts≤60) in terms of a mass %;
heating the copolymer (P) solution obtained in the regulating such that a temperature T (° C.) is in a range of {(225−1.9×Ts)≤T≤(310−1.9×Ts)}; and
discharging the copolymer (P) solution heated in the heating from any one nozzle selected from a rotary wheel atomizer, a two-fluid nozzle atomizer, and a pressure nozzle atomizer at a linear velocity of 1 to 100 m/sec to separate the solvent in an inert gas stream at 0 to 200° C.

2. The method according to claim 1, wherein the copolymer (P) is at least one copolymer selected from the group consisting of a block copolymer comprising a polymer block (b) comprising at least one conjugated diene unit and a polymer block (a) comprising at least one aromatic vinyl compound unit, a hydride of the block copolymer, and a mixture thereof.

3. The method according to claim 1, wherein the copolymer (P) is one produced by liquid phase anionic polymerization with an organic alkali metal compound.

4. The method according to claim 1, wherein a molar weight distribution of the copolymer (P) is in a range of 1.0 to 2.5.

5. The method according to claim 1, wherein the solvent is at least one selected from the group consisting of isopentane, pentane, cyclopentane, hexane, cyclohexane, isoheptane, and heptane.

6. The method according to claim 1, wherein the temperature T (° C.) in the heating is in a range of 200 to 275° C.

7. The method according to claim 1, wherein the solid component concentration (Ts) of the copolymer (P) solution in the regulating is (10≤Ts ≤35) in terms of a mass %.

8. The method according to claim 1, wherein the linear velocity in the discharging is from 5 to 50 m/sec.

9. The method according to claim 1, wherein the temperature of the inert gas in the discharging is from 10 to 120° C.

10. The method according to claim 1, wherein an amount of the inert gas in the discharging is from 0.01 to 5.0 NL relative to 1 kg of the copolymer (P) solution.

11. The method according to claim 1, wherein the copolymer (P) obtained through the discharging is a fibrous copolymer.

12. The method according to claim 1, wherein an amount of the residual solvent in the copolymer (P) obtained through the discharging is 2 mass % or less.

13. The method according to claim 1, wherein a bulk density of the copolymer (P) obtained through the discharging is from 0.02 to 0.20 g/mL, and an oil absorption rate thereof is from 10 to 50 g/g.

* * * * *